United States Patent
Kwon et al.

(10) Patent No.: US 10,299,224 B2
(45) Date of Patent: *May 21, 2019

(54) METHOD AND APPARATUS FOR TRANSMITTING POWER HEADROOM REPORT BY TERMINAL IN WIRELESS COMMUNICATION SYSTEM

(71) Applicant: Pantech Inc., Seoul (KR)

(72) Inventors: Ki Bum Kwon, Seoul (KR); Jae Hyun Ahn, Seoul (KR); Kang Suk Huh, Seoul (KR)

(73) Assignee: Pantech Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,184

(22) Filed: Apr. 6, 2018

(65) Prior Publication Data

US 2018/0227863 A1    Aug. 9, 2018

Related U.S. Application Data

(63) Continuation of application No. 14/782,468, filed as application No. PCT/KR2014/002542 on Mar. 26, 2014, now Pat. No. 9,961,648.

(30) Foreign Application Priority Data

Apr. 5, 2013    (KR) .................. 10-2013-0037322

(51) Int. Cl.
*H04W 72/04*    (2009.01)
*H04W 52/36*    (2009.01)
(Continued)

(52) U.S. Cl.
CPC ..... *H04W 52/365* (2013.01); *H04W 72/0413* (2013.01); *H04W 72/0453* (2013.01); *H04W 88/02* (2013.01); *H04W 88/08* (2013.01)

(58) Field of Classification Search
CPC ........ H04W 56/0005; H04W 56/0015; H04W 56/0045

See application file for complete search history.

(56) References Cited

U.S. PATENT DOCUMENTS 9,065,618 B2    6/2015  Iwai et al.
9,509,483 B2 *  11/2016 Damnjanovic ....... H04W 52/30
(Continued)

FOREIGN PATENT DOCUMENTS

KR    10-2012-0093893    8/2012
KR    10-2013-0027086    3/2013
WO    2013-022318    2/2013

OTHER PUBLICATIONS

International Search Report dated Jun. 24, 2014 in International Application No. PCT/KR2014/002542 (with English Translation).
(Continued)

*Primary Examiner* — Asad M Nawaz
*Assistant Examiner* — Berhanu D Belete
(74) *Attorney, Agent, or Firm* — H.C. Park & Associates, PLC

(57) ABSTRACT

Disclosed are a method and an apparatus for transmitting a power headroom report (PHR) by a terminal which is set to be dually connected to at least two heterogeneous base stations through uplink wireless connection. A method for transmitting a power headroom report (PHR) by a user equipment performing wireless communication based on dual connectivity. The method may include triggering the PHR based on at least one of a path loss change and a periodic timer; and transmitting at least one PHR to at least one base station according to the dual connectivity.

13 Claims, 22 Drawing Sheets

(51) Int. Cl.
*H04W 88/02* (2009.01)
*H04W 88/08* (2009.01)

(56) References Cited

U.S. PATENT DOCUMENTS

| | | | |
|---|---|---|---|
| 9,774,437 B2* | 9/2017 | Loehr | H04L 1/0026 |
| 2011/0158116 A1 | 6/2011 | Tenny et al. | |
| 2011/0292674 A1 | 12/2011 | Ho et al. | |
| 2011/0292874 A1* | 12/2011 | Ho | H04W 52/42 |
| | | | 370/328 |
| 2012/0008600 A1 | 1/2012 | Marinier et al. | |
| 2012/0040708 A1 | 2/2012 | Jeong et al. | |
| 2012/0093020 A1* | 4/2012 | Iwai | H04L 5/0007 |
| | | | 370/252 |
| 2012/0115537 A1* | 5/2012 | Gaal | H04W 52/146 |
| | | | 455/522 |
| 2013/0010720 A1* | 1/2013 | Lohr | H04L 1/0026 |
| | | | 370/329 |
| 2013/0188563 A1* | 7/2013 | Kim | H04W 24/10 |
| | | | 370/328 |
| 2014/0018124 A1* | 1/2014 | Ahn | H04W 24/10 |
| | | | 455/522 |
| 2014/0161111 A1* | 6/2014 | Kim | H04W 56/0005 |
| | | | 370/336 |
| 2014/0177560 A1* | 6/2014 | Guo | H04W 72/1268 |
| | | | 370/329 |
| 2014/0233524 A1 | 8/2014 | Jang et al. | |
| 2015/0215878 A1* | 7/2015 | Wu | H04W 72/0413 |
| | | | 370/329 |
| 2015/0358915 A1* | 12/2015 | Semaan | H04W 52/146 |
| | | | 370/329 |
| 2016/0174236 A1* | 6/2016 | Guo | H04W 72/1268 |
| | | | 370/329 |
| 2017/0093550 A1* | 3/2017 | Loehr | H04L 1/0026 |
| 2017/0303213 A1* | 10/2017 | Park | H04W 52/365 |

OTHER PUBLICATIONS

Written Opinion of International Search Authority dated Jun. 24, 2014 in International Application No. PCT/KR2014/002542 (with English Translation).
International Preliminary Report on Patentability dated Oct. 6, 2015 in in International Application No. PCT/KR2014/002542 (with English Translation).
Non-Final Office Action dated Dec. 2, 2016 in U.S. Appl. No. 14/782,468.
Final Office Action dated Jun. 16, 2017 in U.S. Appl. No. 14/782,468.
Notice of Allowance dated Dec. 20, 2017 in U.S. Appl. No. 14/782,468.

* cited by examiner

PHR (F1)

METHOD AND APPARATUS FOR TRANSMITTING POWER HEADROOM REPORT BY TERMINAL IN WIRELESS COMMUNICATION SYSTEM

CROSS-REFERENCE TO RELATED APPLICATIONS

This application is a Continuation of U.S. patent application Ser. No. 14/782,468, filed on Oct. 5, 2015, now issued as U.S. Pat. No. 9,961,648, which is a National Stage Entry of International Patent Application No. PCT/KR2014/002542, filed on Mar. 26, 2014, and claims priority from and the benefit of Korean Patent Application No. 10-2013-0037322 filed on Apr. 5, 2013, each of which is hereby incorporated by reference for all purposes as if fully set forth herein.

BACKGROUND

Field

Exemplary embodiments relate to wireless communication, and more particularly, to a method and an apparatus for transmitting power headroom by a user equipment dually connected to a plurality of heterogeneous base stations.

Discussion of the Background

A base station can use power headroom information of a user equipment in order to efficiently use resources of the user equipment. A power control technology is an essential core technology for minimizing interference elements and reducing consumption of a battery of the user equipment in order to efficiently distribute the resources in wireless communication.

When the user equipment provides the power headroom information to the base station, the base station can estimate maximum uplink transmission power which the user equipment can cope with. Accordingly, the base station can provide uplink scheduling such as transmission power control, modulation and coding levels, and a bandwidth to the user equipment within a range not to departing from a limit of the estimated maximum uplink transmission power.

Meanwhile, the user equipment can receive services through different frequency bands from a small base station including a small cell and a macro base station including a macro cell. This is also referred to as a dual connection.

A method in which the dually connected user equipment performs efficient uplink resource allocation during reporting power headroom is required.

SUMMARY

Exemplary embodiments provide a method and an apparatus for transmitting a power headroom report.

Exemplary embodiments also provide a method and an apparatus for transmitting a power headroom report based on a connection configuration of a user equipment.

Exemplary embodiments also provide a method and an apparatus for transmitting a power headroom report by a user equipment dually connected to a small base station and a macro base station.

Exemplary embodiments also provide a method and an apparatus for transmitting a power headroom report according to a downlink or uplink connection of the user equipment.

In an aspect, a method for transmitting a power headroom report by a user equipment of which uplink radio connection with two or more different base stations is configured as dual connectivity, includes: triggering the PHR based on a path loss change and a periodic timer; and transmitting at least one PHR to at least one base station according to the dual connectivity; transmitting a PHR including both first power headroom (PH) for a first frequency band which is a serving frequency of the first base station and second PH for a second frequency band which is the serving frequency of the second base station to the first base station or the second base station when the user equipment is capable of simultaneously receiving downlink signals from the first base station and the second base station and simultaneously transmitting an uplink signal; transmitting a PHR including the first PH to the first base station and a PHR including the second PH to the second base station when uplink radio connection of the user equipment with the first base station and the second base station is configured, and the user equipment is capable of simultaneously receiving the downlink signals but transmitting the uplink signal to only one base station at a time; and storing the PHR for the first frequency band in the user equipment and transmitting the PHR for the first frequency band to the second base station in the case where a PHR for the second base station is triggered when the user equipment is capable of receiving the downlink signal from one base station of the first base station and the second base station at a time and transmitting the uplink signal to only the base station at a time corresponding thereto.

According exemplary embodiments, under a situation in which dual connectivity between a macro cell and a small cell, and a user equipment is configured on a network, a power headroom report can be efficiently transferred and uplink resource allocation can be more efficiently performed based thereon.

DETAILED DESCRIPTION OF THE ILLUSTRATED EMBODIMENTS

Figure 1:
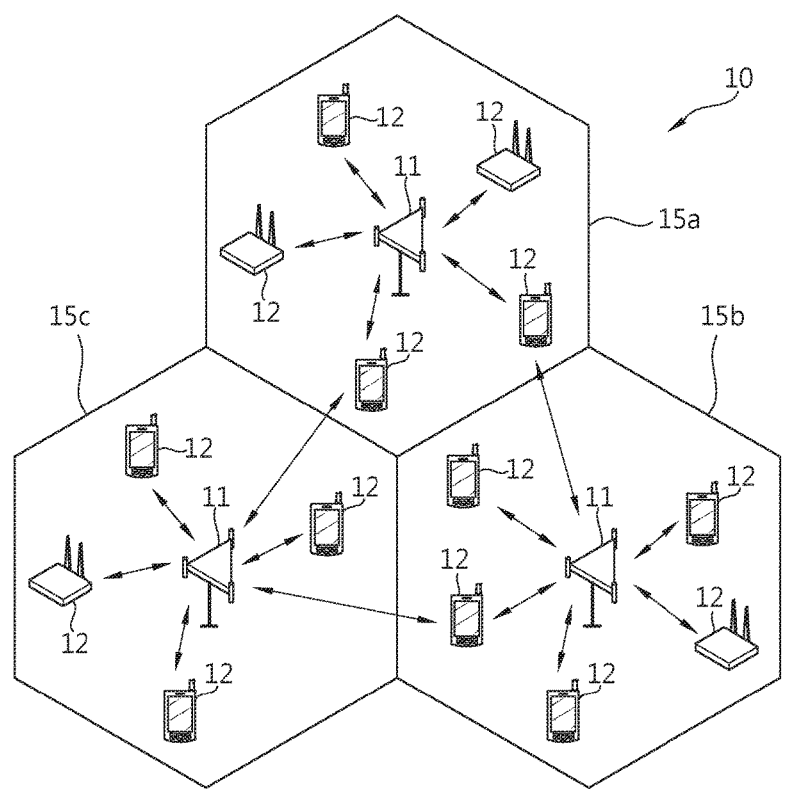
FIG. 1 illustrates a wireless communication system according to an exemplary embodiment.

The inventive concept will be described more fully hereinafter with reference to the accompanying drawings, in which exemplary embodiments are shown. However, the inventive concept can be realized in various different forms, and is not limited to the embodiments described herein. Further, parts not related with the inventive concept are omitted in drawings for clearly describing the exemplary embodiments and like reference numerals which are the same or similar designate like elements the drawings.

FIG. 1 illustrates a wireless communication system according to an exemplary embodiment.

Referring to FIG. 1, the wireless communication system 10 is widely placed to provide various communication services such as a voice, packet data, and the like. The wireless communication system 10 includes at least one base station (BS) 11. Each base station 11 provides a communication service to specific cells 15a, 15b, and 15c. The cell may be redivided into a plurality of areas (referred to as sectors).

A user equipment (UE) 12 may be fixed or movable and may be called other terms such as a mobile station (MS), a mobile user equipment (MT), a user equipment (UT), a subscriber station (SS), a wireless device, a personal digital assistant (PDA), a wireless modem, a handheld device, and the like. The base station 11 may be called other terms such as an evolved-NodeB (eNBb), a base transceiver system (BTS), an access point, a femto base station, a home nodeB, a relay, and the like. The cell needs to be analyzed as a comprehensive meaning representing a partial area covered by the base station and embraces all of various coverage areas including a mega cell, a macro cell, a small cell, a micro cell, a pico cell, femto cell, and the like.

Hereinafter, the downlink means communication from the base station 11 to the UE 12 and the uplink means communication from the UE 12 to the base station 11. In the downlink, the transmitter may be a part of the base station 11 and the receiver may be a part of the UE 12. In the uplink, the transmitter may be a part of the UE 12 and the receiver may be a part of the base station 11.

The wireless communication system may adopt various multiple access techniques including code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, and OFDM-CDMA.

The time division duplex (TDD) scheme in which transmission is performed by different times or the frequency division duplex (FDD) scheme in which transmission is performed by using different frequencies may be used for the uplink transmission and the downlink transmission.

In a physical layer, physical control channels described below are used. A physical downlink control channel (PDCCH) notifies resource allocation of a paging channel (PCH) and a downlink shared channel (DL-SCH) and hybrid automatic repeat request (HARQ) information associated with the DL-SCH to the UE. The PDCCH may transport an uplink grant for notifying resource allocation of uplink transmission to the UE. The DL-SCH is mapped to a physical downlink shared channel (PDSCH). A physical control format indicator channel (PCFICH) notifies the number of OFDM symbols used in the PDCCHs to the UE and is transmitted every subframe. A physical Hybrid ARQ Indicator Channel (PHICH) as a downlink channel transports an HARQ ACK/NACK signal which is a response to the uplink transmission. A physical uplink control channel (PUCCH) transports uplink control information such as an HARQ ACK/NACK signal, a scheduling request, and a CQI for downlink transmission. A physical uplink shared channel (PUSCH) transports an uplink shared channel (UL-SCH). A physical random access channel (PRACH) transports a random access preamble.

A frame is constituted by 10 subframes. The subframe includes a plurality of OFDM symbols. A carrier may have a control channel (e.g., PDCCH) thereof.

A component carrier may be divided into a primary component carrier (PCC) and a secondary component carrier (SCC). The UE may use only one primary component carrier or use one or more secondary component carriers in addition to the primary component carrier. The UE may be allocated with the primary component carrier and/or the secondary component carrier from the base station.

A primary serving cell (alternatively, primary cell or PCell) means one serving cell that provides a security input and non-access stratum mobility information in an RRC connection establishment (alternatively, referred to as configuration) or re-establishment (alternatively, reconfiguration) state. According to capabilities of the user equipment, at least one cell may be configured to form a set of serving cells together with the primary serving cell and the at least one cell is referred to as the second serving cell (alternatively, secondary cell or SCell).

Accordingly, a set of serving cells configured for one user equipment may be configured by only one primary serving cell or by one primary serving cell and at least one secondary serving cell.

A downlink component carrier corresponding to the primary serving cell is referred to as a downlink primary component carrier (DL PCC) and an uplink component carrier corresponding to the primary serving cell is referred to as an uplink primary component carrier (UL PCC). Further, in the downlink, a component carrier corresponding to the secondary serving cell is referred to as a downlink secondary component carrier (DL SCC) and in the uplink, a component carrier corresponding to the secondary serving cell is referred to as an uplink secondary component carrier (UL SCC). Only the downlink component carrier may correspond to one serving cell and both DL CC and the UL CC may correspond to one serving cell.

Accordingly, communication between the UE and the base station which is achieved through the DL CC or UL CC in a carrier system is a concept equivalent to communication between the UE and the base station which is achieved through the serving cell. For example, in a random access performing method according to an exemplary embodiment, transmitting, by the UE, the preamble by using the UL CC may be regarded as a concept equivalent to transmitting the preamble by using the primary serving cell or the secondary serving cell. Further, receiving, by the UE, downlink information by using the DL CC may be regarded as a concept equivalent to receiving the downlink information buy using the primary serving cell or the secondary serving cell.

Meanwhile, the primary serving cell and the secondary serving cell have the following features.

First, the primary serving cell is used for transmission of the PUCCH. On the contrary, the secondary serving cell may not transmit the PUCCH, but transmit some control information among information in the PUCCH through the PUSCH.

Second, the primary serving cell is continuously activated, while the secondary serving cell is a carrier activated/deactivated according to a specific condition. The specific condition may become a case in which an activation/deactivation indicator of the base station is received or a deactivated timer in the UE expires. The activation represents that traffic data is transmitted or received or is in a ready state. The deactivation represents that the traffic data cannot be transmitted or received, or measurement or minimum information can be transmitted/received.

Third, in the primary serving cell, the DL PCC and the UL PCC are constituted as a pair.

Fourth, different CCs may be configured as the primary serving cells in respective user equipments.

Fifth, the PUCCH configured in the primary serving cell may be defined with respect to the special secondary serving cell. Alternatively, a contention based random access procedure may be defined with respect to the special secondary serving cell. The PUCCH may be defined with respect to a specific secondary serving cell later, and as a result, a type of a PUCCH including type 1 power headroom information and type 2 power headroom information for the special secondary serving cell are included may be considered.

Sixth, the PUCCH for the special secondary serving cell may be fixedly configured at the time of configuring the special secondary serving cell or allocated (configured) or cancelled by RRC signaling (RRC reconfiguration message) when the base station reconfigures the PUCCH for the corresponding secondary serving cell.

The PUCCH for the special secondary serving cell may include ACK/NACK information or channel quality information (CQI) of secondary serving cells which exist in a specific group which the base station configures by using the RRC signaling. Herein, the specific group may be a secondary timing alignment group (sTAG) or a group constituted by serving cells included in a specific base station (e.g., a macro base station including only macro cells or a small base station including only small cells).

Seventh, the base station may configure one special secondary serving cell among multiple secondary serving cells in the specific group or not configure the special secondary serving cell. The reason why the base station does not configure the special secondary serving cell is that it is determined that the contention based random access procedure or the PUCCH need not be configured for the specific group. As one example, such a case is a case in which it is determined that the contention based random access procedure need not be performed even in any secondary serving cell in the specific group or it is determined that a capacity of the PUCCH of the current primary serving cell is sufficient, and as a result, a PUCCH for an additional secondary serving cell need not be configured.

The technical spirit regarding the features of the primary serving cell and the secondary serving cell is not particularly limited to the above description and this is just an example and may include more examples.

In a wireless communication environment, a propagation delay may occur while a transmitter propagates a radio wave and a receiver transfers the radio wave. Accordingly, even tough both the transmitter and receiver accurately know the time when the transmitter propagates the radio wave, a time when a signal reaches the receiver is influenced by a distance between the transmitter and the receiver, a surrounding propagation environment, and the like and when the receiver moves, the time varies according to the time. When the receivers may not accurately know the time of receiving the signal transferred by the transmitter, a failure in receiving the signal is made or a distorted signal is received in spite of receiving the signal, and as a result, communication becomes invalid.

Accordingly, in a wireless communication system, synchronization between the base station and the UE needs to be particularly decided first in order to receive an information signal regardless of downlink or downlink. The type of the synchronization includes various types including frame synchronization, information symbol synchronization, sampling period synchronization, and the like. Herein, the sampling period synchronization is synchronization which needs to be most basically acquired in order to distinguish a physical signal.

In the case of the uplink, the base station receives signals transmitted from multiple UEs. When distances between the respective UEs and the base station are different from each other, signals received by the respective base stations have different transmission delay times and when uplink information is transmitted based on downlink synchronization acquired by each UE, the corresponding base station receives information of each UE at different times. In this case, the base station may not acquire synchronization based on any one UE. Accordingly, acquisition of uplink synchronization requires a procedure a different procedure from acquisition of the downlink synchronization.

A random access procedure is performed to acquire the uplink synchronization of the UE and during the random access procedure, the UE acquires the uplink synchronization based on a timing alignment value (alternatively, referred to as a TA value) transmitted from the base station. In terms of advancing an uplink time, the timing alignment value may also be called a timing advanced value.

Meanwhile, in a multiple-carrier system, one UE performs communication with the base station through a plurality of component carriers or a plurality of serving cells. When all signals of the plurality of serving cells configured in the UE have the same time delay, the UE may acquire the uplink synchronization for all serving cells only by one timing alignment value. On the contrary, when the signals of the plurality of serving cells have different time delays, different timing alignment values are required for the respective serving cells. That is, multiple timing alignment values are required. When the UE performs the random access one by one for each serving cell in order to acquire the multiple timing alignment values, overhead may occur in limited uplink resources and complexity of the random access may increase. A timing alignment group (TAG) is defined in order to reduce the overhead and the complexity.

The timing alignment group may include the primary serving cell and the timing alignment group may include at least one secondary serving cell.

Hereinafter, power headroom (PH) will be described.

The power headroom means spare power which may be additionally used in addition to power which the UE currently uses for uplink transmission. For example, it is assumed that maximum transmission power which is uplink transmission power in an allowable range of the UE is 10 W and it is assumed that the UE currently uses power of 9 W in a frequency band of 10 MHz. In this case, since the UE may additionally use 1 W, the power headroom becomes 1 W.

Herein, when the base station allocates a frequency band of 20 MHz to the UE, power of 18 W (=9 W×2) is required. However, since maximum power of the UE is 10 W, when 20 MHz is allocated to the UE, the UE may not use the entirety of the frequency band or the power is insufficient, and as a result, the base station may not normally receive the signal of the UE. In order to solve the problem, the UE reports that the power headroom is 1 W to the base station to allow the base station to perform scheduling within a power headroom range. Such a report is referred to as a power headroom report (PHR).

Through a power headroom reporting procedure, 1) information on a difference between maximum transmission power of the UE which is nominal for each activated serving cell and estimated UL-SCH (PUSCH) transmission power, 2) information on a difference between maximum transmission power of the UE which is nominal in the primary serving cell and estimated PUCCH transmission power, or 3) information on a difference between the maximum transmission power of the UE which is nominal in the primary serving cell and the estimated UL-SCH and PUCCH transmission power may be transmitted to the serving base station.

The power headroom report may be defined as two types (type 1 and type 2). Power headroom of a predetermined UE may be defined with respect to subframe i for serving cell c.

<1. Power Headroom Report Type 1 (Type 1 Power Headroom)>

In regard to the type 1 power headroom, there are cases where the UE 1) transmits only the PUSCH without the PUCCH, 2) transmits both the PUCCH and the PUSCH, and 3) does not transmit the PUSCH.

First, in the case where the UE transmits the PUSCH without the PUCCH with respect to subframe i for serving cell c, power headroom for a type 1 report is shown in an equation given below.

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB] \quad [\text{Equation 1}]$$

Where, $P_{CMAX,c}(i)$ is a value acquired by converting maximum UE transmission power, $\tilde{P}_{CMAX,c}(i)$ configured with respect to serving cell c into a decibel value [dB].

Where, $P_{CMAX}(i)$ is a maximum UE transmission power value calculated by applying offset values set on a network based on a maximum transmission power value set based on the smaller value of a $P_{EMAX}$ value set based on P-max as a value which the base station transmits to the UE through the RRC signaling and a $P_{PowerClass}$ value determined by a transmission power class determined by the level of hardware of each UE. Herein, the offset values may be a maximum power reduction (MPR) value, an additional maximum power reduction (A-MPR) value, and a power management maximum power reduction (P-MPR) value and additionally adopt an offset value $\Delta T_C$ adopted according to a band having a lot of filter characteristics in a transmitting unit of the UE or not.

The $P_{CMAX,c}(i)$ is a value configured only for serving cell c unlike $P_{CMAX}(i)$. Therefore, the P-max value is also a value $P_{EMAX,c}$ configured with respect to serving cell c and each of the offset values are also calculated as a value configured only for serving cell c. That is, the offset values are constituted by $MPR_c$, $A\text{-}MPR_c$, $P\text{-}MPR_c$, and $\Delta T_{C,c}$. However, the $P_{PowerClass}$ value is calculated by using a value which is the same as a value used in calculation by the unit of the UE.

Further, $M_{PUSCH,c}(i)$ is a value acquired by expressing a bandwidth of a resource which the PUSCH is allocated in subframe i for serving cell c as the number of RBs.

In addition, $P_{O\_PUSCH,c}(j)$ represents the sum of $P_{O\_NOMINAL\_PUSCH,c}(j)$ and $P_{O\_UE\_PUSCH,c}(j)$ for serving cell c and j is 0 or 1 from a higher layer. In the case of semi-persistent grant PUSCH transmission (alternatively, retransmission), j is 0, while in the case of dynamic scheduled grant PUSCH transmission (alternatively, retransmission), j is 1 and in the case of random access response grant PUSCH transmission (alternatively, retransmission), j is 2. Further, in the case of the random access response grant PUSCH transmission (alternatively, retransmission), $P_{O\_UE\_PUSCH,c}(2)=0$ and $P_{O\_NOMINAL\_PUSCH,c}(2)$ represents the sum of $P_{O\_PRE}$ and $\Delta_{PREAMBLE\_Msg3}$, where parameters $P_{O\_PRE}$(preambleInitialReceivedTargetPower) and $\Delta_{PREAMBLE\_Msg3}$ are signaled from the higher layer.

When j is 0 or 1, one of $\alpha_c \in \{0, 0.4, 0.5, 0.6, 0.7, 0.8, 0.9, 1\}$ values may be selected by a 3-bit parameter provided from the higher layer. When j is 2, $\alpha_c(j)=1$ at all times.

$PL_c$ represents a Db value of a prediction value of downlink path loss (also referred to as PL or path attenuation or path decrement) for serving cell c calculated in the UE and may be acquired from "referenceSignalPower-higher layer filtered RSRP". Herein, referenceSignalPower as a value provided from the higher layer represents a dBm unit of an energy per resource element (EPRE) value of a downlink reference signal. Reference signal received power (RSRP) represents a received power value of the reference signal for a reference serving cell. The serving cell selected as the reference serving cell and determination of referenceSignal-Power and higher layer filtered RSRP used for calculating the $PL_c$ is configured by athlossReferenceLinking which is a higher layer parameter. Herein, the reference serving cell configured by pathlossReferenceLinking may be a DL SCC of a secondary serving cell SIB2-connected with (corresponding to) the primary serving cell or the UL CC.

Further, $\Delta_{TF,c}(i)$ represents a parameter for reflecting an influence by a modulation coding scheme (MCS) and a value of $\Delta_{TF,c}(i)$ is $10 \log_{10}((2^{BPRE \cdot K_s}-1) \cdot \beta_{offset}^{PUSCH})$. Where, $K_s$ represents a parameter provided as deltaMCS-Enabled from the higher layer with respect to each serving cell c and is 1.25 or 0 and in particular, in the case of transmission mode 2 which is a mode for transmit diversity, $K_s$ is 0 at all times. Further, in the case where only control information is transmitted through the PUSCH without the UL-SCH, $BPRE = O_{CQI}/N_{RE}$ and in other cases, $$BPRE = \sum_{r=0}^{C-1} \frac{K_r}{N_{RE}},$$

where, C represents the number of code blocks, $K_r$ represents the size of the code block, $O_{CQI}$ represents the number of CQI/PMI bits including a CRC bit number, and $N_{RE}$ represents the number of determined resource elements (that is, $N_{RE} = M_{SC}^{PUSCH-initial} \cdot N_{symb}^{PUSCH-initial}$). Further, in the case where only the control information is transmitted through the PUSCH without the UL-SCH data, $\beta_{offset}^{PUSCH} = \beta_{offset}^{CQI}$ is configured and in other cases, $\beta_{offset}^{PUSCH}$ is set to 1 at all times.

In addition, $\delta_{PUSCH,c}$ a correction value is determined by referring to a TPC command that exists in DCI format 0 or DCI format 4 for serving cell c or a TPC command in DCI format 3/3A encoded and transmitted commonly with other UEs. The DCI format 3/3A may be verified by only UEs to which the RNTI value is allocated because CRC parity bits are scrambled to TPC-PUSCH-RNTI. Herein, in the case of the RNTI value, when a predetermined UE is constituted by multiple serving cells, different RNTI values may be allocated for each serving cell in order to distinguish each serving cell. In this case, a PUSCH power control adjustment state for current serving cell c is given as $f_c(i)$ and when accumulation is activated by the higher layer with respect to serving cell c or when DCI format 0 in which the TPC command, $\delta_{PUSCH,c}$ is scrambled by temporary-C-RNTI is included in the PDCCH, "$f_c(i)=f_c(i-1)+\delta_{PUSCH,c}(i-K_{PUSCH})$". Where, $\delta_{PUSCH,c}(i-K_{PUSCH})$ represents a TPC command which exists in DCI format 0/4 or 3/3A in the PDCCH transmitted in an $(i-K_{PUSCH})$-th subframe and $f_c(0)$ represents a first value after accumulation is reset. Further, a value of $K_{PUSCH}$ is 4 in the case of FDD. In the case where the PDCCH that schedules PUSCH transmission in subframe 2 or 7 when TDD UL/DL is set 0, if a least significant bit (LSB) value of a UL index in DCI format 0/4 in the PDCCH is set to 1, $K_{PUSCH}$ is 7.

Second, in the case where the UE transmits both the PUCCH and the PUSCH with respect to subframe i for serving cell c, the type 1 power headroom is shown in an equation given below.

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB] \quad \text{[Equation 2]}$$

Where, $\tilde{P}_{CMAX,c}(i)$ is a value calculated on the assumption that only the PUSCH is transmitted in subframe i. In this case, the physical layer transfers $\tilde{P}_{CMAX,c}(i)$ to the higher layer instead of $P_{CMAX,c}(i)$.

Third, in the case where the UE does not transmit the PUSCH with respect to subframe i for serving cell c, the type 1 power headroom is shown in an equation given below.

$$PH_{type1,c}(i) = \tilde{P}_{CMAX,c}(i) - \{P_{O\_PUSCH,c}(1) + \alpha_c(1) \cdot PL_c + f_c(i)\}[dB] \quad \text{[Equation 3]}$$

Where, $\tilde{P}_{CMAX,c}(i)$ is calculated on the assumption that MPR is 0 dB, A-MPR is 0 dB, P-MPR is 0 dB, and $\Delta T_C$ is 0 dB.

<2. Power Headroom Report Type 2 (Type 2 Power Headroom)>

In regard to the type 2 power headroom, there are a case where the UE transmits both the PUCCH and the PUSCH with respect to subframe i for the primary serving cell, a case where the UE transmits the PUSCH without the PUCCH, a case where the UE transmits the PUCCH without the PUSCH, and a case where the UE does not transmit the PUCCH or the PUSCH.

First, in the case where the UE transmits both the PUCCH and the PUSCH with respect to subframe i for the primary serving cell, the type 2 power headroom is shown in an equation given below.

[Equation 4]

$$PH_{type2}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{O\_PUCCH} + PL_c + h(n_{CQI}, n_{HARQ}, n_{SR}) + \Delta_{F\_PUCCH}(F) + \Delta_{TxD}(F') + g(i))/10}\right)$$

[dB]

Where, $\Delta_{F\_PUCCH}(F)$ is defined in the higher layer (RRC) and each $\Delta_{F\_PUCCH}(F)$ value coincides with PUCCH format (F) associated with PUCCH format 1a. Herein, each PUCCH format (F) is shown in a table given below.

TABLE 1

| PUCCH format | Modulation scheme | Bit number per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

When the UE is configured to transmit the PUCCH with respect to two antenna ports by the higher layer, a value of $\Delta_{TxD}(F')$ for each PUCCH format F' is received from the higher layer. Otherwise, $\Delta_{TxD}(F')=0$ at all times.

Further, $h(n_{CQI}, n_{HARQ}, n_{SR})$ has different values for each PUCCH format. Where, $n_{CQI}$ represents the bit number of the channel quality information (CQI). Further, in the case where a scheduling request (SR) is configured in subframe i and the SR is not configured in a predetermined transmission block associated with the UL-SCH of the UE, $n_{SR}=1$ and in other cases, $n_{SR}=0$. When the UE is configured in one serving cell, $n_{HARQ}$ represents the HARQ-ACK bit number transmitted in subframe i. For PUCCH format 1/1a/1b, $h(n_{CQI}, n_{HARQ}, n_{SR})=0$. In the case where the UE is configured in one or more serving cells for PUCCH format 1b of channel selection, $h(n_{CQI}, n_{HARQ}, n_{SR})=(n_{HARQ}-1)/2$ and in other cases, $h(n_{CQI}, n_{HARQ}, n_{SR})=0$. For PUCCH format 2/2a/2b and a normal cyclic prefix, in the case where $n_{CQI}$ is equal to or larger than 4, $h(n_{CQI}, n_{HARQ}, n_{SR})=10 \log_{10}(n_{CQI}/4)$ and in other cases, $h(n_{CQI}, n_{HARQ}, n_{SR})=0$. For PUCCH format 2 and an extended cyclic prefix, in the case where "$n_{CQI}+n_{HARQ}$" is equal to or larger than 4, $h(n_{CQI}, n_{HARQ}, n_{SR})=10$ $\log_{10}((n_{CQI}+n_{HARQ})/4)$ and in other cases, $h(n_{CQI},n_{HARQ}, n_{SR})=0$. For PUCCH format 3, in the case where the UE is configured to transmit the PUCCH at two antenna ports by the higher layer or the UE is configured to transmit the HARQ-ACK/SR of 11 bits, $h(n_{CQI},n_{HARQ},n_{SR})=(n_{HARQ}+n_{SR}-1)/3$ and in other cases, $h(n_{CQI},n_{HARQ},n_{SR})=(n_{HARQ}+n_{SR}-1)/2$. $P_{O\_PUCCH}$ represents a parameter configured by the sum of parameters $P_{O\_NOMINAL\_PUCCH}$ and $P_{O\_UE\_PUCCH}$ provided by the upper layer.

Second, in the case where the UE transmits the PUSCH without the PUCCH with respect to subframe i for the primary serving cell, the type 2 power headroom is calculated in an equation given below.

[Equation 5]

$$PH_{type2}(i) = P_{CMAX,c}(i) - 10\log_{10}\left(10^{(10\log_{10}(M_{PUSCH,c}(i))+P_{O\_PUSCH,c}(j)+\alpha_c(j)\cdot PL_c+\Delta_{TF,c}(i)+f_c(i))/10} + 10^{(P_{O\_PUCCH}+PL_c+g(i))/10}\right) \ [dB]$$

Third, in the case where the UE transmits the PUCCH without the PUSCH with respect to subframe i for the primary serving cell, the type 2 power headroom is calculated in an equation given below.

[Equation 6]

$$PH_{type2}(i) = P_{CMAX,c}(i) - 10\log_{10}\left(10^{(P_{O\_PUSCH,c}(j)+\alpha_c(j)\cdot PL_c+f_c(i))/10} + 10^{(P_{O\_PUCCH}+PL_c+h(n_{CQI},n_{HARQ},n_{SR})+\Delta_{F\_PUCCH}(F)+\Delta_{T \times D}(F')+g(i))/10}\right) \ [dB]$$

Fourth, in the case where the UE does not transmit the PUCCH or the PUSCH with respect to subframe i for the primary serving cell, the type 2 power headroom is calculated in an equation given below.

[Equation 7]

$$PH_{type2}(i) = P_{CMAX,c}(i) - 10\log_{10}\left(10^{(P_{O\_PUSCH,c}(j)+\alpha_c(j)\cdot PL_c+f_c(i))/10} + 10^{(P_{O\_PUCCH}+PL_c+g(i))/10}\right) \ [dB]$$

Where, $\tilde{P}_{CMAX,c}(i)$ is calculated on the assumption that MPR is 0 dB, A-MPR is 0 dB, P-MPR is 0 dB, and $\Delta T_C$ is 0 dB.

The power headroom value is determined by the unit of 1 dB and needs to be determined as a value which is nearest among values in the range of 40 dB to −23 dB through round-off. The determined power headroom value is transferred from the physical layer to the higher layer.

Meanwhile, the reported power headroom is a value estimated in one subframe.

When an extended power headroom report (hereinafter, referred to as extended PHR) is not configured, only the type 1 power headroom value for the primary serving cell is reported. On the contrary, when the extended PHR is configured, the type 1 power headroom value and the type 2 power headroom value are reported to respective activated serving cells in which the uplink is configured. The extended PHR will be described below in detail.

A power headroom reporting delay represents a difference between a start point of time of a power headroom reference interval and a point of time when the UE starts transmitting the power headroom value through a radio interface. The power headroom reporting delay needs to be 0 ms and the power headroom reporting delay may be applied to all configured triggering techniques for reporting the power headroom.

Mapping of the reported power headroom may be given as shown in a table given below.

TABLE 2

| Reported value | Measured quantity value (dB) |
|---|---|
| POWER_HEADROOM_0 | −23 ≤ PH <−22 |
| POWER_HEADROOM_1 | −22 ≤ PH <−21 |
| POWER_HEADROOM_2 | −21 ≤ PH <−20 |
| POWER_HEADROOM_3 | −20 ≤ PH <−19 |
| POWER_HEADROOM_4 | −19 ≤ PH <−18 |
| POWER_HEADROOM_5 | −18 ≤ PH <−17 |
| . . . | . . . |
| POWER_HEADROOM_57 | 34 ≤ PH <35 |
| POWER_HEADROOM_58 | 35 ≤ PH <36 |
| POWER_HEADROOM_59 | 36 ≤ PH <37 |
| POWER_HEADROOM_60 | 37 ≤ PH <38 |
| POWER_HEADROOM_61 | 38 ≤ PH <39 |
| POWER_HEADROOM_62 | 39 ≤ PH <40 |
| POWER_HEADROOM_63 | PH = 40 |

Referring to Table 2, the power headroom belongs to the range of −23 dB to +40 dB. When 6 bits are used to express the power headroom, 64 ($=2^6$) indexes may be shown, and as a result, the power headroom is divided into a total of 64 levels. As one example, when the bit for expressing the power headroom is "0" ("000000" when the power headroom is expressed by 6 bits, "0" indicates that the level of the power headroom is "$-23 \leq P_{PH} <-22$ dB".

Meanwhile, the power headroom report may be controlled through a periodic PHR timer periodicPHR-Timer (hereinafter, referred to as a "periodic timer") and a prohibition timer prohibitPHR-Timer. A "dl-PathlossChange" value is transmitted through the RRC message to control triggering of the power headroom report by a change in path loss value which the UE measures in the downlink and a change in power backoff request value (P-MPR) by power management.

The power headroom report may be triggered when at least one of events described below occurs.

As one example, in at least one activated serving cell used as path loss reference after the UE last transmits the power headroom power report by securing an uplink resource for new transmission, the path loss value (e.g., a path loss estimation value measured by the UE) is more largely changed and the prohibition timer expires or when the prohibition timer expires and the path loss value (db) is more largely changed in at least one activated serving cell used as the path loss reference, the power headroom report is triggered. The path loss estimation value may be measured by the UE based on the RSRP.

As another example, when the periodic timer expires, the power headroom report is triggered. Since the power headroom is frequently changed, the UE triggers the power headroom report when the periodic timer expires and redrives the periodic timer when the power headroom is reported according to the periodic power headroom reporting method.

As yet another example, when a configuration or a reconfiguration associated with a power headroom reporting operation except for prohibition of use is achieved by the higher layer such as the RRC or the MAC, the power headroom report is triggered.

As yet another example, when the secondary serving cell in which the uplink is configured is activated, the power headroom report is triggered.

As yet another example, when the UE secures the uplink resource for new transmission, even any one of the activated serving cells in which the uplink is configured last transmits the power headroom report in uplink data transmission or PUCCH transmission through the uplink resource in the corresponding TTI and thereafter, resource allocation for the uplink transmission is achieved or when the PUCCH transmission exists in the corresponding cell and when the change in power backoff request value P-MPR$_c$ is larger than the "dl-PathlossChange" [dB] value after the last power headroom reporting, the power headroom report is triggered.

As one example of the triggering, when the UE is allocated with the resource for new transmission for the corresponding TTI, three steps described below are performed.

(1) In first uplink resource allocation for new transmission after last MAC resetting, the periodic timer starts.

(2) In the case of the power headroom report in which at least one power headroom report is triggered after the last power headroom report transmission or the transmitted power headroom report is first triggered and in the case where allocated uplink resources provide a sufficient space to transmit a power headroom report MAC control element (including the extended PHR), 1) when the extended PHR is configured, each uplink is configured and the type 1 power headroom value is acquired with respect to the activated serving cell and when the UE is allocated with the uplink resource for the uplink transmission to the corresponding TTI through the corresponding serving cell, the UE acquires a value equivalent to a P$_{CMAX,c}$ field from the physical layer and generates and transmits the extended power headroom report MAC control element. 2) When the extended PHR is configured and simultaneous PUCCH-PUSCH is configured, the type 2 power headroom value for the primary serving cell is acquired and when the UE transmits the PUCCH to the corresponding TTI, the value equivalent to the P$_{CMAX,c}$ field and generates and transmits the extended PHR MAC CE. 3) When the extended PHR is not configured, the UE acquires the type 1 power headroom value from the physical layer and generates and transmits the power headroom report MAC control element.

(3) The UE starts or restarts the periodic timer, starts or restarts the prohibition timer, and cancels all triggered power headroom reports.

Meanwhile, the extended PHR MAC CE is verified by an LCID in a sub header of an MAC PDU. The extended PHR MAC CE may have various sizes.

Hereinafter, dual connectivity in the small cell will be described.

The UE may receive services through different frequency bands or the same frequency band from a small base station including only at least one small cell and a macro base station including only at least one macro cell. This is also referred to as dual connectivity of the UE. The dual connectivity may be an operation in which the UE connected with at two different network points consumes radio resources provided by the network points. A base station having low transmission power such as the small base station is also referred to as a low power node (LPN).

A case in which a frequency resource is allocated to the base station includes a case in which the base station (hereinafter, referred to as the small base station) including the small cell and the base station (hereinafter, referred to as the macro base station) including the macro cell use different frequency bands (e.g., a case in which the small base station uses an F1 frequency band and the macro base station uses an F2 frequency band) or a case in which the small base station and the macro base station have the same frequency band.

Figure 2:
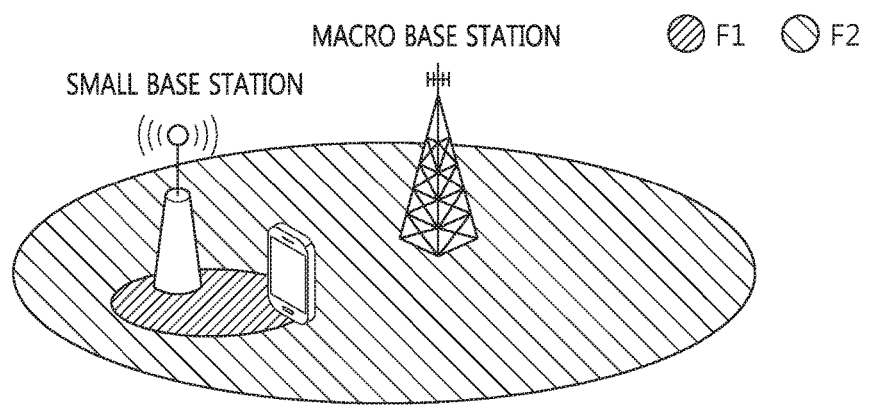
FIG. 2 illustrates one example of a dual connectivity situation of UE according to an exemplary embodiment.

FIG. 2 illustrates one example of a dual connectivity situation of UE according to an exemplary embodiment.

Referring to FIG. 2, the F2 frequency band is allocated to the macro base station and the F1 frequency band is allocated to the small base station. The UE may receive the service from the macro base station through the F2 frequency band and receive the service from the small base station through the F1 frequency band.

As such, when the UE is dually connected to the small cell and the macro cell, a method in which the UE is configured to be connected with both the small cell and the macro cell or operates the connection is proposed.

In a wireless communication system (e.g., an LTE system), a connection configuration between the UE and the cell may be divided into a logical path configuration and a radio connection configuration.

The logical path configuration is a path configuration for transmitting data end-to-end. For example, the logical path configuration includes an EPS bearer configuration, a radio bearer configuration, and the like.

The logical path configuration may not include the radio connection configuration or include a configuration for a partial or entire radio connection configuration.

The radio connection configuration is a series of configurations required for actually transmitting and receiving wireless communication data. For example, the radio connection configuration includes a system information configuration, a PHY/MAC parameter configuration, an RRC connection configuration, and the like.

An exemplary embodiment includes a method for operating the PHR in respective radio connection modes as possible under the situation in which the dual connectivity between the macro cell and the small cell, and the UE is configured.

Figure 3:
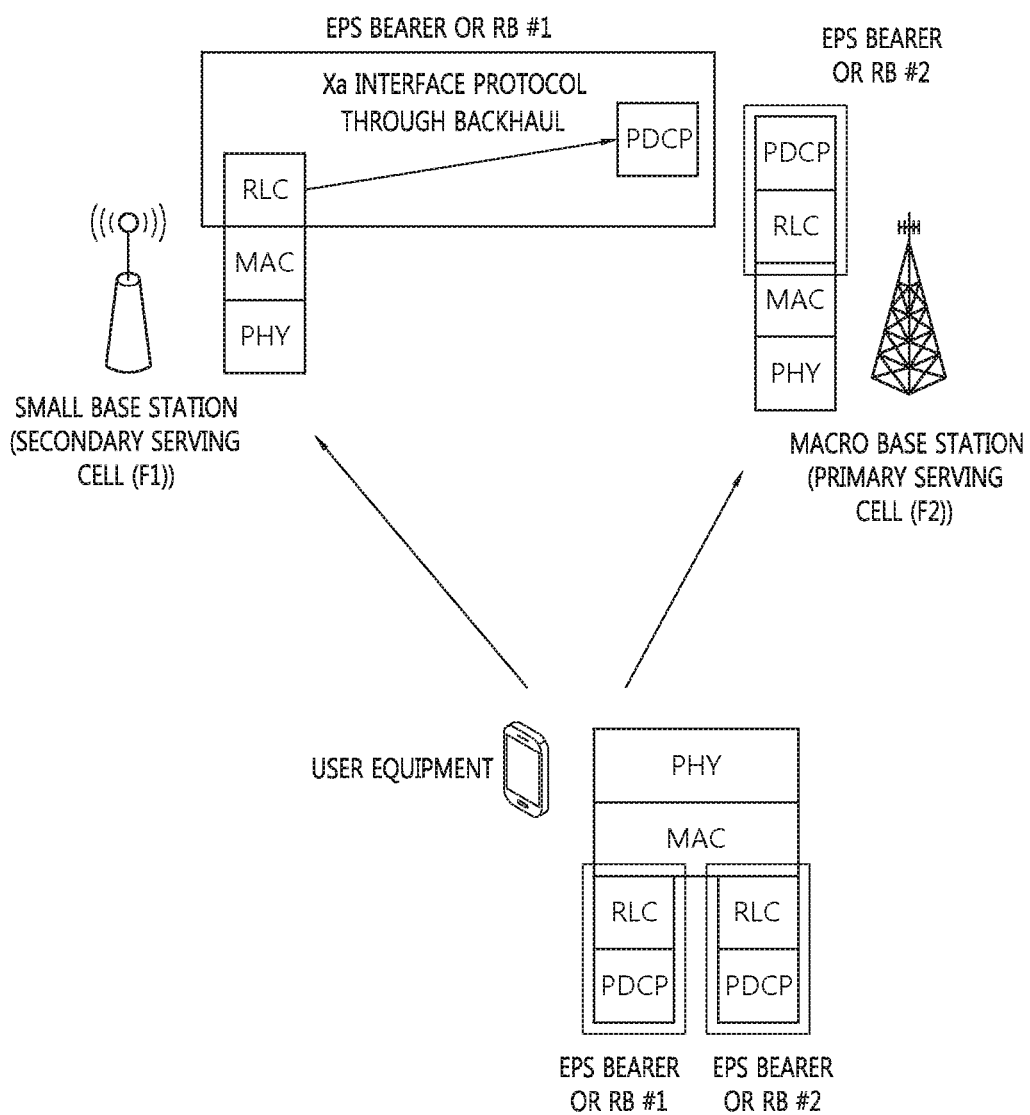
FIG. 3 is one example of a case in which UE is configured to be dually connected with a small base station and a macro base station.
Figure 4:
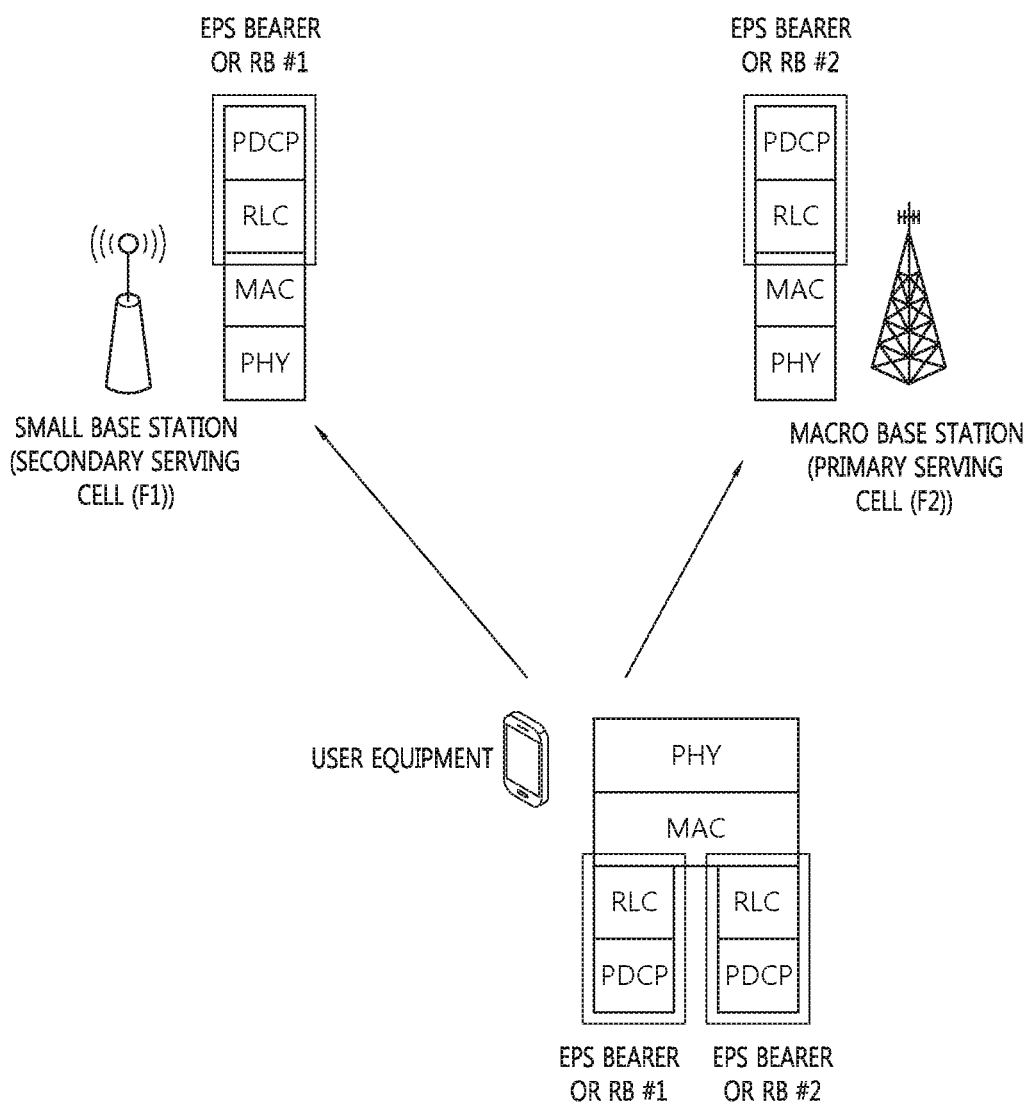
FIG. 4 is another example of a case in which UE is configured to be dually connected with a small base station.

In an exemplary embodiment, the logical path configuration will be described as an example through FIGS. 3 and 4 given below. However, exemplary embodiments is not limited thereto. Description of the macro cell and description of the small cell may be changed with each other.

As one example of the dual connectivity, the higher layer (e.g., RLC/PDCP layer) configured for a data service for the UE exists in only one base station according to the base station including the macro cell or the small cell, independently exists for each base station, or exists for each base station, however, may be connected by a mutual cooperation relationship or a master-servant relationship.

FIG. 3 is one example of a case in which UE is configured to be dually connected with a small base station and a macro base station.

Referring to FIG. 3, the macro base station includes the PDCP, RLC, MAC, PHY layers, but the small base station includes the RLC, MAC, and PHY layers.

The PDCP layer of the macro base station is connected with the RLC layer of the small base station by using an Xa interface protocol through backhaul. Since the PDCP layer is separated from a RAN layer, the separation is also referred to as a RAN split. Herein, the Xa interface protocol may become an X2 interface protocol defined between the base stations in the LTE system.

The UE receives the service from the small base station by using the F1 frequency band as the secondary serving cell and receives the service from the macro base station by using the F2 frequency band as the primary serving cell.

In the case of the RAN split, signaling through the backhaul physically connected between the macro base station and the small base station reaches after a comparatively large delay time (e.g., 25 ms to 60 ms), the macro base station may become a schedule for the UE. The reason is that the scheduler needs to be able to support dynamic resource allocation by a very short time unit (e.g., 1 ms) in the wireless communication system designed for high-speed transmission, such as the LTE system at present.

In this case, due to the delay time of the signaling through the backhaul, performance may deteriorate by a difference between a generation time and an actual application time of scheduling information for the dynamic resource allocation in a small base station without the scheduler. Accordingly, a separate scheduler is required even in the small base station. This corresponds to case 1 to be described below.

On the contrary, a control plane such as the RRC layer may exist only in the macro base station due to effectiveness, security, reliability, handover control, and the like of a radio link. In spite of performance deterioration of resource efficiency through the small base station, the scheduler exists only in the macro base station.

The delay time needs to be at most small until the scheduling information is generated by the UE and transferred to the base station and in the case of control information generated by the UE and provided to the scheduler, the UE transmits uplink transmission including the control information only to one base station (that is, the macro base station0 including the scheduler. This corresponds to case 2 or 3 to be described below.

Meanwhile, whether the scheduler exists is more closely associated with whether the RRC layer exists apart from the RAN split/CN split. When layers of the RCL layer or higher exist in all base stations, there is a possibility that scheduling of the MAC/PHY will be performed by a separate scheduler.

FIG. 4 is another example of a case in which UE is configured to be dually connected with a small base station.

Referring to FIG. 4, each of the small base station and the macro base station includes the PDCP, RLC, MAC, and PHY layers.

Each of the macro base station and the small base station includes the PDCP layer and each base station may schedule the uplink transmission of the UE.

Since, the EPS bearer is separated from a core network, the separation is also referred to as the CN split.

Hereinafter, according to an exemplary embodiment, it is described that the UE that is configured to uplink radio connection with two or more base stations triggers the power headroom report and configures power headroom information and reports the configured power headroom information to each base station, according to downlink and uplink transmission modes.

It is described that uplink and downlink connections of the UE are divided into three cases. The uplink and downlink connections of the UE are described in three cases including 1) a case in which a downlink signal may be simultaneously received from two or more different base stations and the uplink signal may be simultaneously transmitted, 2) a case in which downlink signal may be simultaneously received from two or more different base stations, but the uplink signal may be transmitted to only one base station at a time, and 3) a case in which the downlink signal may be received from one base station among two or more different base stations at a time and the uplink signal may be transmitted only to the base station at a time corresponding thereto.

<Case 1: A Case in which the Downlink Signal May be Simultaneously Received from Two or More Different Base Stations and the Uplink Signal May be Simultaneously Transmitted to Different Base Stations>

Figure 5:
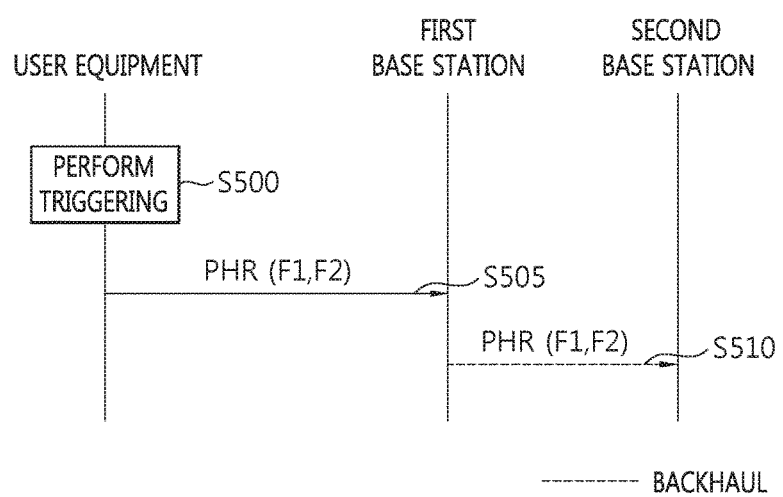
FIG. 5 is a flowchart illustrating one example of a procedure in which UE reports power headroom according an exemplary embodiment.

FIG. 5 is a flowchart illustrating one example of a procedure in which UE reports power headroom according to an exemplary embodiment. FIG. 5 illustrates an example in which a first base station and a second base station shares PHR information through backhaul connection (Embodiment 1-1).

Referring to FIG. 5, the UE triggers a power headroom report (PHR) based on a path loss (PathLoss: PL) change for triggering or based on a PHR periodic timer (S500).

As one example, the UE triggers the PHR based on the path loss change for triggering.

In detail, after transmitting the PHR most recently (alternatively, immediately previously) based on a current point of time, the UE triggers the PHR when a situation in which a variation width of a path loss value (e.g., by the unit of dB) in at least one activated serving cell used as a path loss reference (PLR) is equal to or more than a predetermined value (e.g., a value set to 'dl-PathlossChange') occurs and a PHR prohibit timer (e.g., prohibitPHR-Timer) expires or when the PHR prohibit timer expires and the situation occurs.

Herein, PLR represents a DL CC which is a criterion for measuring the RSRP value in order to calculate a path loss. The PLR is configured to select a DL CC more appropriate to the uplink control. This is associated with a deployment situation.

For example, in the case of different DL CCs defined in the same frequency band, when all of the DL CCs are transmitted by the same base station, the path losses for the respective DL CCs will be substantially similar to each other. However, when the DL CCs are transmitted through base stations or RRHs which exist at different physical positions, respectively, the path losses for the respective DL CCs will be different from each other. Therefore, the path loss reference for measuring the path loss may be configured differently according to a base station targeted by a UL CC.

Figure 6:
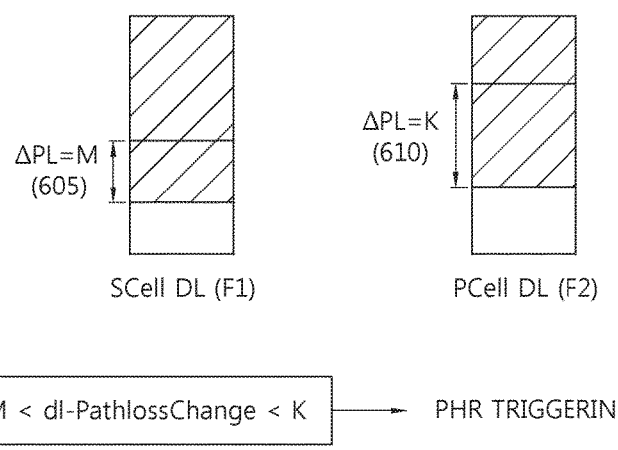
FIG. 6 illustrates one example in which UE triggers a PHR based on a change in path loss value.

FIG. 6 illustrates one example in which UE triggers a PHR based on a change in path loss value.

Referring to FIG. 6, since a path loss value (M, 650) of the secondary serving cell is smaller than a predetermined threshold dl-PathlossChange, but a path loss value (K, 610) of the primary serving cell is larger than the predetermined threshold dl-PathlossChange, the UE triggers the PHR when the PHR prohibit timer expires.

In this case, serving cells (that is, the primary serving cell or the secondary serving cell) in which the path loss value is calculated is one of the serving cells which exist in the macro base station or the small base station.

The PLR of the secondary serving cell in sTAG is a DL CC of the secondary serving cell itself. The PLR of the secondary serving cell in pTAG is the DL CC of the secondary serving cell itself or a DL CC of the primary serving cell and which CC the corresponding PLR is may be determined through the RRC signaling.

Figure 7:
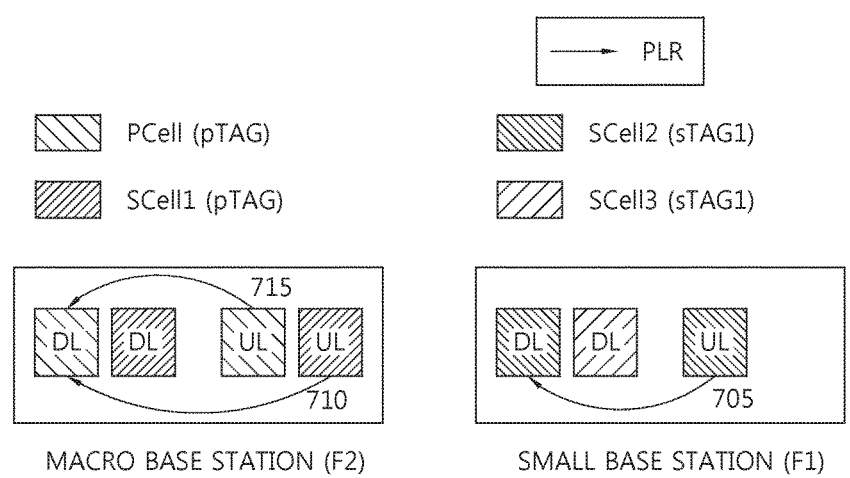
FIG. 7 is a diagram illustrating one example of a PLR configuration according to an exemplary embodiment.

FIG. 7 is a diagram illustrating one example of a PLR configuration according to an exemplary embodiment.

Referring to FIG. 7, the PLR of SCell2 which is the secondary serving cell in sTAG1 is a DL CC 705 of the PLR itself.

Further, the PLR of SCell1 in pTAG is a DL CC 710 of the PLR itself or a DL CC 715 of PCell.

Meanwhile, the PHR prohibit timer may be configured by the unit of the UE or by the unit of the base station. When the PHR prohibit timer is configured based on the base station, the PHR prohibit timer may be constituted by PHR prohibit timers.

Figure 8:
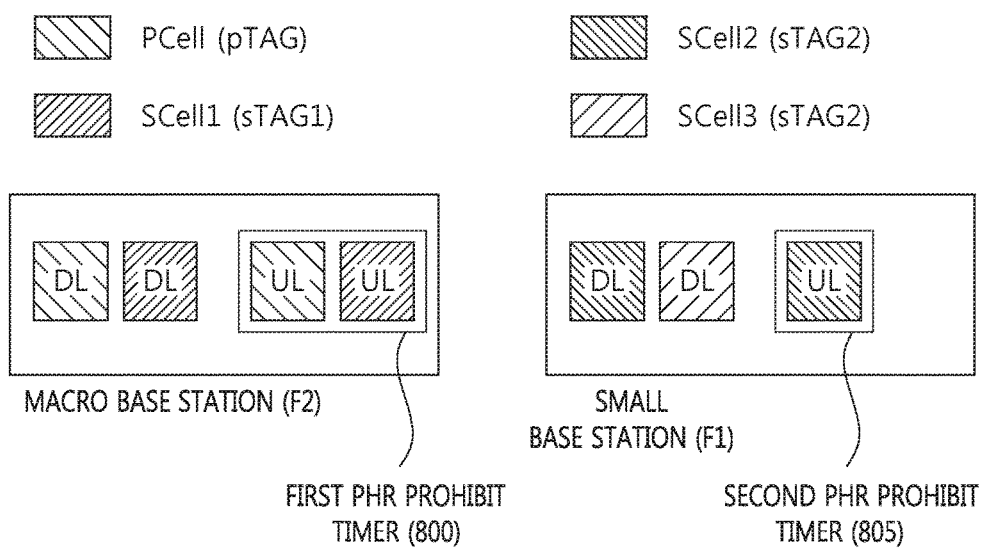
FIG. 8 is a diagram illustrating one example of a configuration of a PHR prohibit timer.

FIG. 8 is a diagram illustrating one example of a configuration of a PHR prohibit timer.

Referring to FIG. 8, a first PHR prohibit timer (Prohibit timer1) 800 may be configured with respect to the macro base station and a second PHR prohibit timer (Prohibit timer2) 805 may be configured with respect to the small base station. The first PHR prohibit timer is configured with respect to uplink transmission of the primary time advance group pTAG and the secondary time advance group sTAG1 included in the macro base station and the second PHR prohibit timer is configured with respect to uplink transmission of the secondary time advance group sTAG2. Further, the PHR prohibit timer may be configured for each serving cell. The PHR prohibit timer which exists in each serving cell starts a timer operation when the PHR for the corresponding serving cell is configured and transmitted. For example, when a PHR including PH related information for the primary serving cell and the first secondary serving cell is transmitted, timers configured in the primary serving cell and the first secondary serving cell simultaneously start. However, in the case of the second secondary serving cell not included in the PHR, the time does not start.

Meanwhile, as another example of the PHR triggering criterion in step S500, the UE triggers the PHR when the PHR periodic timer expires.

In this case, the PHR periodic timer may be configured by the unit of the UE or by the unit of the base station. Alternatively, the PHR periodic timer may be configured similarly to the PHR prohibit timer of FIG. 8.

Subsequently to step S500, when the PHR transmission criterion is satisfied, the UE transmits the PHR to the first base station (S505). As one example, since both the macro base station and the small base station receive the uplink signal from the UE, the first base station may be any one of the macro base station and the small base station. As another example, the first base station may be a scheduler for a Small cell SmC and the second base station may be a scheduler for the MAC.

As one example, the 'PHR transmission criterion' may be a case in which a space is provided, which is sufficient to transmit an extended PHR MAC CE in which uplink resources allocated in the same TTI with respect to the serving cells corresponding to each base station include both PH,c (that is, PH for serving cell c) and $P_{CMAX,c}$ (that is, $P_{CMAX}$ for serving cell c) for all activated serving cells. When the PHR transmission criterion is satisfied, the UE transmits the PHR.

The PHR includes both the PH for the frequency band F1, and PH,c and $P_{CMAX,c}$ for the frequency band F2. The reason is that power headroom information for the frequency bands F1 and F2 is all required for efficient uplink resource allocation for the UE which is dually connected to the small base station and the macro base station under the situation in which both the small base station and the macro base station may be the schedulers for the UE.

The first base station may perform uplink scheduling for the UE based on the PHR.

Figure 9:
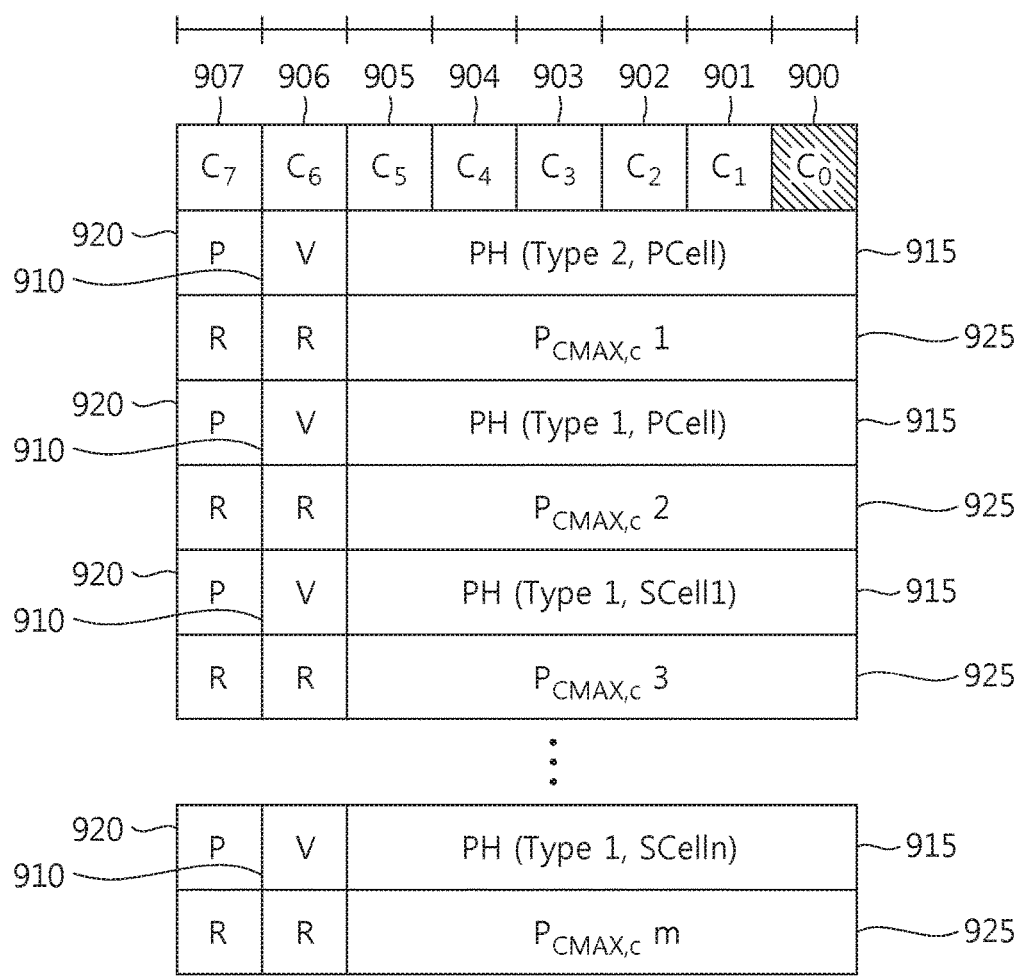
FIG. 9 illustrates one example of an MAC control element of a PHR which UE transmits to a first base station or a second base station according an exemplary embodiment.

FIG. 9 illustrates one example of an MAC control element of a PHR which UE transmits to a first base station or a second base station according to an exemplary embodiment. For example, the MAC control element of the PHR may be the extended PHR MAC control element (CE).

Referring to FIG. 9, a $C_i$ field 901 to 907 means a secondary serving cell index (SCell Index) "i", and means that the PH value is reported in the corresponding secondary serving cell when the $C_i$ field is "1" and means that the PH value is not reported in the corresponding secondary serving cell when the $C_i$ field is "0".

Meanwhile, a $C_0$ field 900 which is configured as an index corresponding to the primary serving cell may indicate that "PH,c" and "$P_{CMAX},c$" for the primary serving cell are included. That is, the $C_0$ field 900 serves to indicate whether the transmitted PHR MAC CE is associated with the scheduler including the primary serving cell.

Further, a V field 910 is an indicator indicating whether the PH value is a PH value based on actual transmission or a PH value for a reference format. In the case of the type 1 power headroom report, when 'V=0', 0 indicates that the PUSCH is actually transmitted and when 'V=1', 1 indicates that a PUSCH reference format is used. In the case of the type 2 power headroom report, when 'V=0', 0 indicates that the PUCCH is actually transmitted and when 'V=1', 1 indicates that a PUCCH reference format is used. When 'V=0' commonly with respect to the type 1 power headroom report and the type 2 power headroom report, 0 indicates that an associated $P_{CMAX,c}$ field exists and when 'V=1', 1 indicates that the associated $P_{CMAX},c$ field is omitted.

Further, a PH field 915 may be a field for a power headroom value and 6 bits.

Further, a P field indicates whether the UE applies power backoff (P-MPR) by power management and as one example, when the $P_{CMAX},c$ field value has a different value due to the power backoff, 'P=1' is configured.

In addition, the $P_{CMAX},C$ field indicates $P_{CMAX},c$ or $\tilde{P}_{CMAX,c}$ used for calculating the PH field and the field value may exist or not.

Subsequently to step S505, the first base station transfers the PHR from the first base station to the second base station through the backhaul (S510).

The PHR includes both the PH for the frequency band F1 and the PH for the frequency band F2.

As one example, when the first base station is the macro base station, the second base station is the small base station.

As another example, when the first base station is the small base station, the second base station is the macro base station.

The second base station may perform uplink scheduling for the UE based on the PHR.

Figure 10:
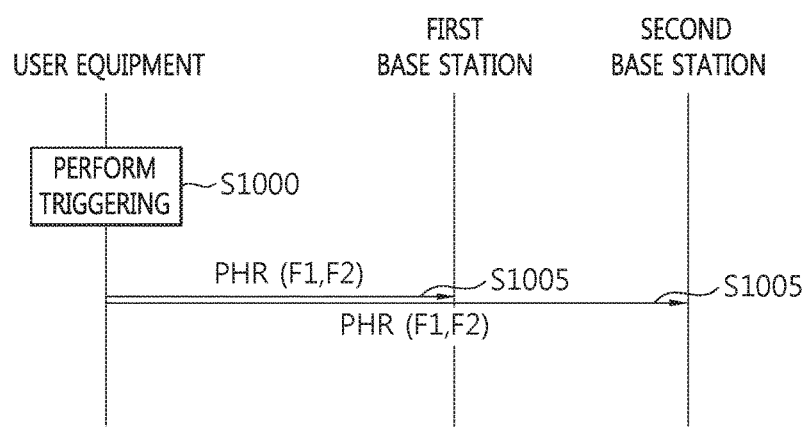
FIG. 10 is a flowchart illustrating another example of a procedure in which UE reports power headroom according an exemplary embodiment.

FIG. 10 is a flowchart illustrating another example of a procedure in which UE reports power headroom according to an exemplary embodiment. FIG. 10 illustrates an example in which the UE directly transmits the PHR to the first base station and the second base station regardless of connection (e.g., backhaul) between the first base station and the second base station (Embodiment 1-2). This is also referred to as direct signaling.

Referring to FIG. 10, the UE triggers the power headroom report (PHR) based on the path loss change for triggering or based on the PHR periodic timer (S1000).

As one example, the UE triggers the PHR based on the path loss change for triggering.

As another example, the UE triggers the PHR based on the case in which the PHR periodic timer expires for triggering. In this case, the PHR periodic timer may be configured by the unit of the UE or by the unit of the base station or similarly to the PHR prohibit timer.

Subsequently to step S1000, when the PHR transmission criterion is satisfied, the UE duplicatively transmits the PHR to the first base station and the second base station (S1005).

The duplicative transmission includes simultaneous transmission and non-simultaneous transmission. The simultaneous transmission means that the PHR is transmitted when the UE receives uplink resource allocation information from all base stations (e.g., the small base station and the macro base station) with respect to the same TTI or is configured and the non-simultaneous transmission means that the UE transmits the PHR to the base station which receives the uplink resource allocation information or is configured.

As one example, when one timer may be configured for each UE, the simultaneous transmission may be performed or when one timer may be configured for each base station, the non-simultaneous transmission may be performed.

As another example, in the duplicative transmission, the UE may transmit the PHR to a plurality of base stations through one specific cell. In this case, one specific cell may be a cell in which a specific scheduler exists.

That is, the PHR transmission to the first base station and the PHR transmission to the second base station may be simultaneously performed, or the PHR transmission to the first base station may be first performed or the PHR transmission to the second base station may be first performed.

As yet another example, the first base station may be one of the macro base station and the small base station. As still another example, the first base station may be the scheduler for the Small cell SmC and the second base station may be the scheduler for the MAC.

Meanwhile, as one example, the 'PHR transmission criterion' may be a case in which the space is provided, which is sufficient to transmit the extended PHR MAC CE in which uplink resources allocated in the same TTI with respect to the serving cells corresponding to each base station include both PH,c and $P_{CMAX,c}$ for all activated serving cells. When the PHR transmission criterion is satisfied, the UE transmits the PHR.

The PHR includes both the PH for the frequency band F1 and the PH for the frequency band F2. As one example, the MAC control element of the PHR is illustrated in FIG. 9.

Each of the first base station and the second base station may perform the uplink scheduling for the UE based on the PHR.

<Case 2: A Case in which the Downlink Signal May be Simultaneously Received from Two or More Different Base Stations, but the Uplink Signal May be Transmitted to Only One Base Station at a Time>

Figure 11:
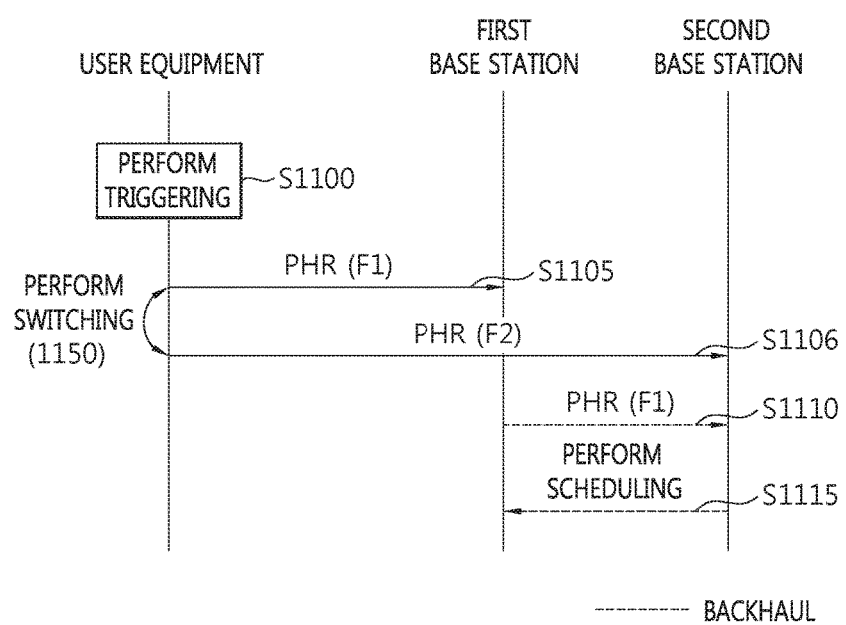
FIG. 11 is a flowchart illustrating yet another example of a procedure in which UE reports power headroom according an exemplary embodiment.

FIG. 11 is a flowchart illustrating yet another example of a procedure in which UE reports power headroom according to an exemplary embodiment. FIG. 11 illustrates an example in which the second base station having an uplink physical layer scheduling authority schedules the first base station having no uplink physical layer scheduling authority through backhaul connection (Embodiment 2-1). For example, the example is the case of the RAN split illustrated in FIG. 3.

As one example, the first base station may be the scheduler for the MAC.

As another example, the PHR may be transmitted when the UE performs an uplink time division multiplexing (TDM) operation.

As yet another example, the second base station may be the macro base station and the first base station may be the small base station.

Referring to FIG. 11, the UE triggers the power headroom report (PHR) based on the path loss change for triggering or based on the PHR periodic timer (S1100).

As one example, the UE triggers the PHR based on the path loss change for triggering.

As another example, the UE triggers the PHR based on the case in which the PHR periodic timer expires for triggering. In this case, the PHR periodic timer may be configured by the unit of the UE or by the unit of the base station or similarly to the PHR prohibit timer.

As yet another example, the downlink criterion for triggering the PHR may be switched together according to uplink switching. That is, downlink monitoring is not performed according to a consecutive time, but is inconsecutive and an operation for triggering the PHR is performed based on only a time when each downlink is operated.

Subsequently to step S1100, when the PHR transmission criterion is satisfied, the UE transmits the PHR to the first base station (S1105) or transmits the PHR to the second base station (S1106). S1105 and S1106 are performed in a time sequence in FIG. 11, but this is just one example and S1106 may be performed earlier than S1105, but S1105 and S1106 may not be simultaneously performed.

Since the UE may perform the uplink transmission to only one base station at a time, the UE transmits the PHR to one base station of the first base station and the second base station through switching 1150.

Herein, the PHR transmitted to the first base station is the PHR for the frequency band F1 and the PHR transmitted to the second base station is the PHR for the frequency band F2.

Figure 12:
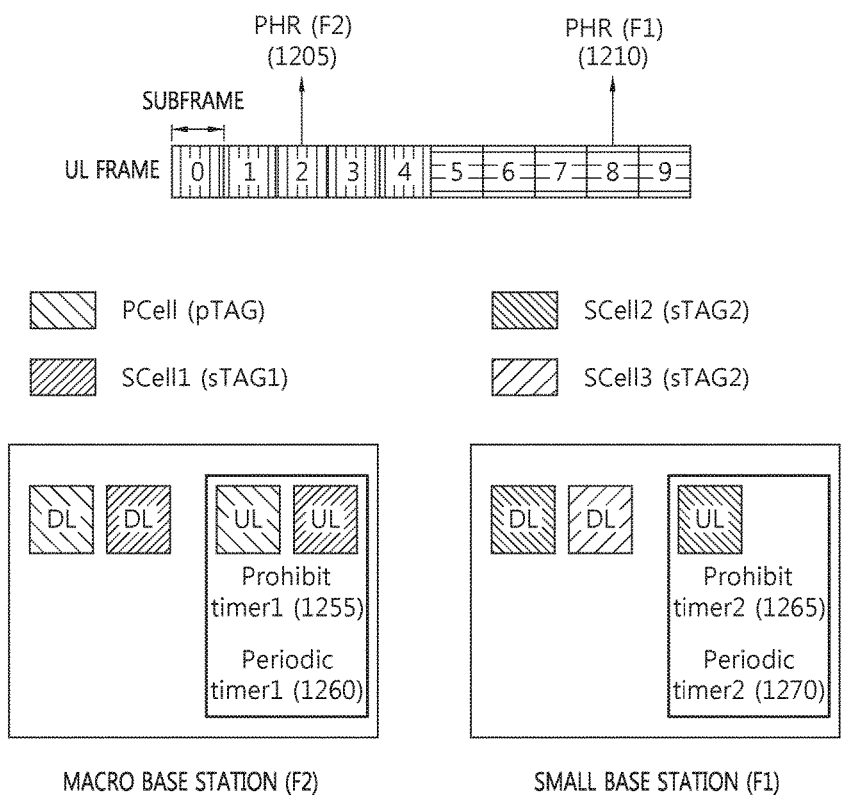
FIG. 12 illustrates one example of an uplink frame structure including a PHR which UE transmits to a first base station or a second base station according an exemplary embodiment.

FIG. 12 illustrates one example of an uplink frame structure including a PHR which UE transmits to a first base station or a second base station according to an exemplary embodiment.

Referring to FIG. 12, the UE transmits a PHR 1205 for the frequency band F2 to the second base station by using one (e.g., subframe #2) of subframe#0 to subframe #4 of an uplink frame. In this case, a first PHR prohibit timer (Prohibit timer1) 1255 and a first PHR periodic timer (Periodic timer1) 1260 may be configured with respect to PCell or Scell1.

Figure 13:
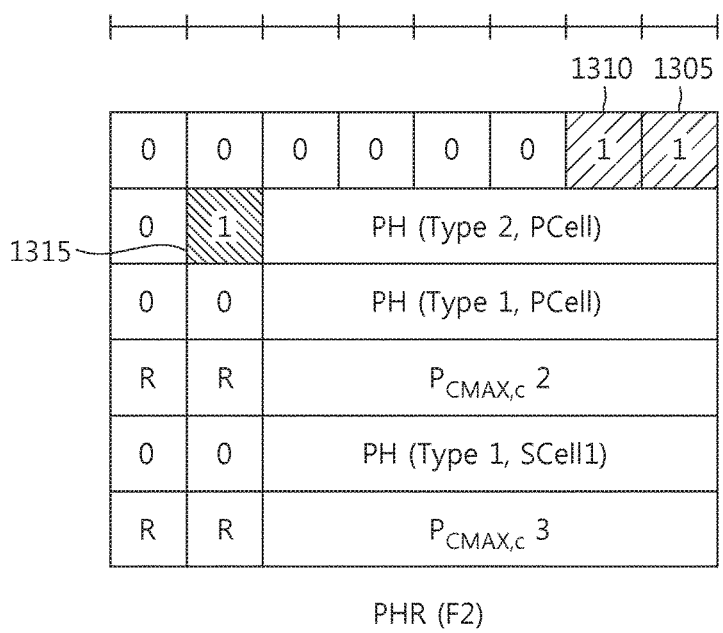
FIG. 13 illustrates one example of a PHR MAC CE which UE transmits to a base station including a primary serving cell.

FIG. 13 illustrates one example of a PHR MAC CE which UE transmits to a base station including a primary serving cell.

Referring to FIG. 13, a primary serving cell index 1305 and an SCell1 index 1310 are '1'. This indicates that the PH values are reported in the primary serving cell and the Scell1.

Further, a V field 1315 for primary serving cell type 2 power headroom is '1'. This indicates that the PH uses the PUCCH reference format.

Further, the PHR MAC CE is constituted by only 6 bytes (means 8 bits, that is, 1 byte). The reason is that only the PHR for the frequency band F2 is transmitted to the second base station including the primary serving cell.

Meanwhile, in FIG. 12, the UE transmits a PHR 1210 for the frequency band F1 to the first base station by using one (e.g., subframe #8) of subframe#5 to subframe #9 of the uplink frame. In this case, a second PHR prohibit timer (Prohibit timer2) 1265 and a second PHR periodic timer (Periodic timer2) 1270 may be configured with respect to Scell2.

Figure 14:
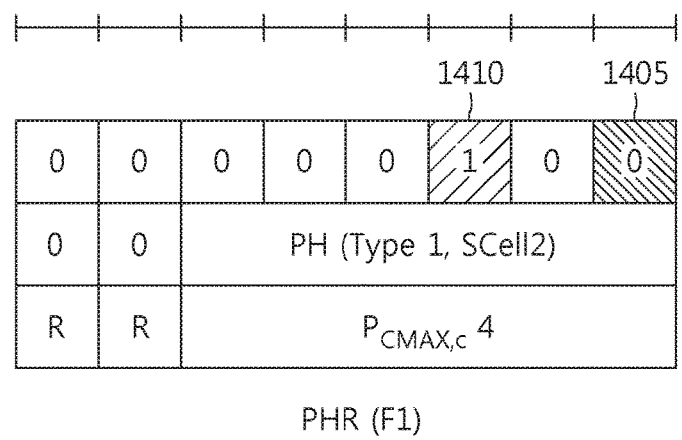
FIG. 14 illustrates one example of a PHR MAC CE which UE transmits to a base station not including a primary serving cell.

FIG. 14 illustrates one example of a PHR MAC CE which UE transmits to a base station not including a primary serving cell.

Referring to FIG. 14, a primary serving cell index 1405 is '0' and an SCell2 index 1410 is '1'. This indicates that the PH value is reported in the Scell2.

Further, the PHR MAC CE is constituted by 3 bytes. The reason is that only the PHR for the frequency band F1 is transmitted to the first base station. That is, an activated serving cell that belongs to another base station is excluded from PHR components.

Consequently, the UE transmits the uplink frame to alternately transmit the PHR for the frequency band F2 and the PHR for the frequency band F1.

When the first base station has no physical layer scheduling authority and the second base station has the uplink physical layer scheduling authority, the first base station may not perform the uplink scheduling for the UE in spite of receiving the PHR. Since the second base station receives only the PHR for the frequency band F2, the second base station may perform the uplink scheduling for the UE until receiving the PHR for the frequency band F1.

Subsequently to step S1105, the first base station transfers the PHR for the first base station to the second base station through the backhaul (S1110). As a result, the second base station may receive both the PHRs for the frequency bands F1 and F2. Further, the second base station may perform the uplink scheduling for the UE based on the PHR.

Subsequently to step S1110, the second base station may transfer scheduling to information for the UE to the first base station (S1115).

As one example, in the case of the RAN split illustrated in FIG. 3, the PDCP layer of the second base station is connected with the RLC layer of the first base station by the Xa interface protocol through the backhaul to transfer the scheduling information.

Figure 15:
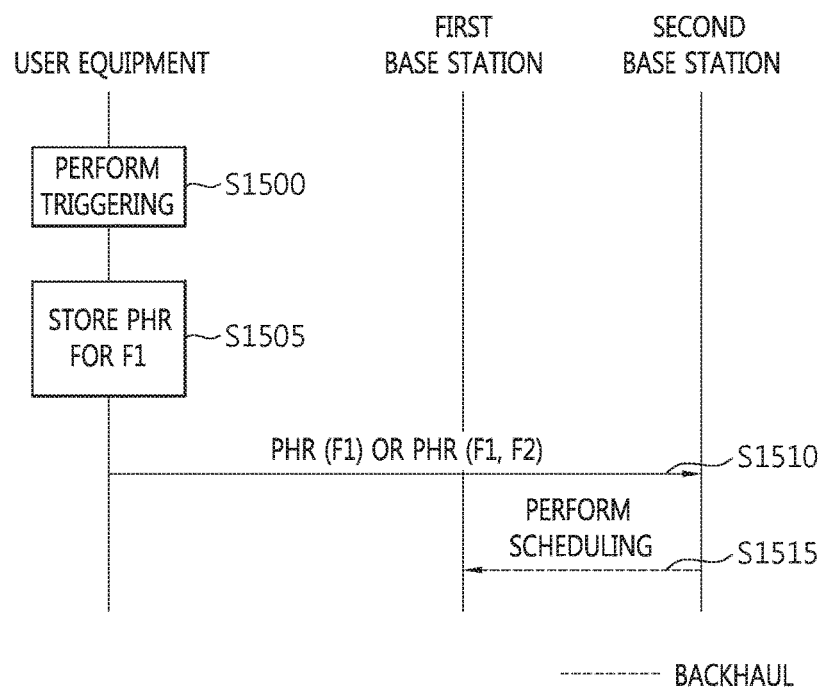
FIG. 15 is a flowchart illustrating still another example of a procedure in which UE reports power headroom according an exemplary embodiment.

FIG. 15 is a flowchart illustrating still another example of a procedure in which UE reports power headroom according to an exemplary embodiment. FIG. 15 is an example in which the second base station having an uplink physical layer scheduling authority may not transfer the PHR by backhaul-connecting the first base station having no uplink physical layer scheduling authority, and the UE wirelessly transmits the PHR for all serving cells to the second base station (Embodiment 2-2).

As another example, in the case of the RAN split illustrated in FIG. 3, since the second base station schedules the first base station, the second base station is macro base station and the first base station is a small base station.

Referring to FIG. 15, the UE triggers the PHR based on the path loss change for triggering or based on the PHR periodic timer (S1500).

As one example, the UE triggers the PHR based on the path loss change for triggering.

As another example, the UE triggers the PHR based on the case in which the PHR periodic timer expires for triggering. In this case, the PHR periodic timer may be configured by the unit of the UE or by the unit of the base station or similarly to the PHR prohibit timer.

In this case, the PHR periodic timer may be configured by the unit of the UE or by the unit of the base station. Alternatively, the PHR periodic timer may be configured similarly to the PHR prohibit timer of FIG. 8. [0232] As yet another example, the downlink criterion for triggering the PHR may be switched together according to uplink switching.

Subsequently to step S1500, the UE stores the PHR for the frequency band F1 therein (S1505), and when the PHR transmission criterion is satisfied, the UE transmits the PHR for the frequency band F1 or the PHR for the frequency bands F1 and F2 to the second base station (S1010).

Figure 16:
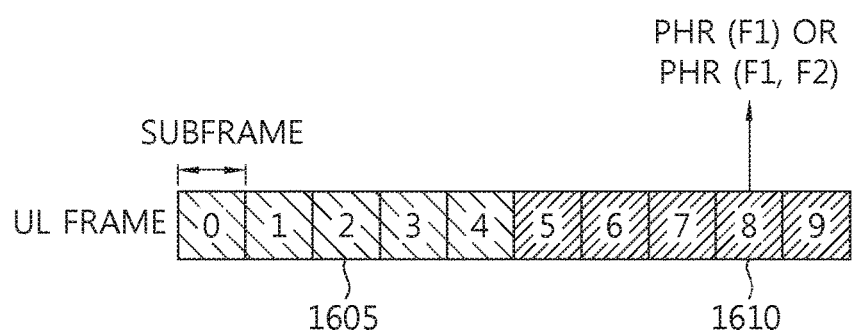
FIG. 16 illustrates one example of an uplink frame structure including a PHR which UE transmits to a second base station according an exemplary embodiment.

FIG. 16 illustrates one example of an uplink frame structure including a PHR which UE transmits to a second base station according to an exemplary embodiment.

Referring to FIG. 16, even though the PHR transmission for the frequency band F1 is triggered due to the TDM, the UE may not transmit the PHR for the frequency band F1 by using one (for example, subframe #2) 1605 of subframe #0 to subframe #4 in the uplink frame.

The reason is that in the TDM type, the PHR for F1 and the PHR for F2 are sequentially transmitted.

Instead, the UE constitutes the PHR for the frequency band F1 to save the PHR therein.

In order to transmit all of the triggered PHRs to the macro base station, in a initially configured uplink resource 1610 (for example, subframe #8), the UE transmits the PHR for the frequency band F1 or the PHRs for the frequency bands F1 and F2.

As an example, regardless of whether to transmit the PHR for the frequency band F2, the UE may irrespectively transmit the PHR for the frequency band F1. Of course, when the PHR for the frequency band F2 is triggered before, the PHR for the frequency band F1 may be transmitted together.

Figure 17:
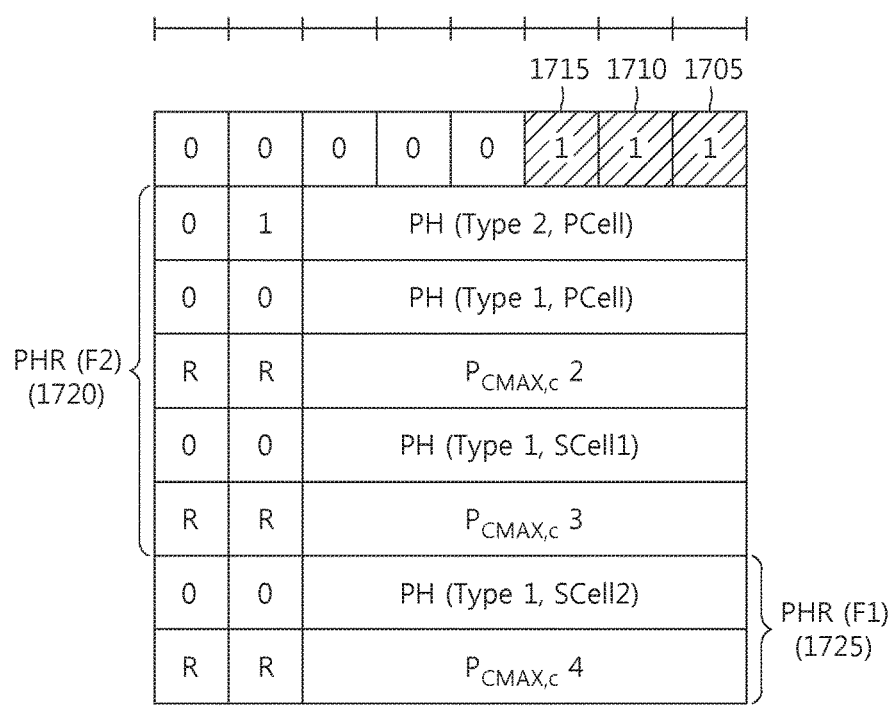
FIG. 17 illustrates yet another example of a PHR MAC CE which UE transmits to a base station according to an exemplary embodiment.

FIG. 17 illustrates yet another example of the PHR MAC CE which UE transmits to the base station.

Referring to FIG. 17, a primary serving cell index 1705 is '0' and an index 1710 for SCell2 and SCell2 is '1'. This indicates that the PH values are reported in the primary serving cell, the SCell2, and the SCell2.

Further, the PHR MAC CE is constituted by 8 bytes, in second to sixth bytes, a PHR 1720 for the frequency band F2 is included, and in seventh to eighth bytes, a PHR 1725 for the frequency band F1 is included.

That is, only activated serving cells belonging to another base station may be included in the PHR MAC CE. However, the transmitted PHR information does not include "PHR,c" or "$P_{CMAX}$,c" values simultaneously calculated with respect to all activated cells in the same TTI. The PHR information is constituted by the PHR,c and $P_{CMAX}$,c values calculated only when each base station and the UE are connected to each other in different TTIs with uplink.

Consequently, the UE transmits the uplink frame to simultaneously transmit the PHR for the frequency band F1 regardless of the PHR for the frequency band F2.

As another example, when the PHR for the frequency band F2 is transmitted (alternatively, the PHR for the frequency band F2 is triggered), the UE may transmit the PHR for the frequency band F1 to the second base station together with the PHR for the frequency band F2. That is, in an interval when uplink transmission for the base station with a scheduler is possible, when the PHR for the base station (alternatively, a base station with the primary serving cell) without the scheduler is triggered and an uplink resource capable of transmitting the PHR is ensured, the PHR for the base station without the scheduler may be configured to be transmitted together.

Figure 18:
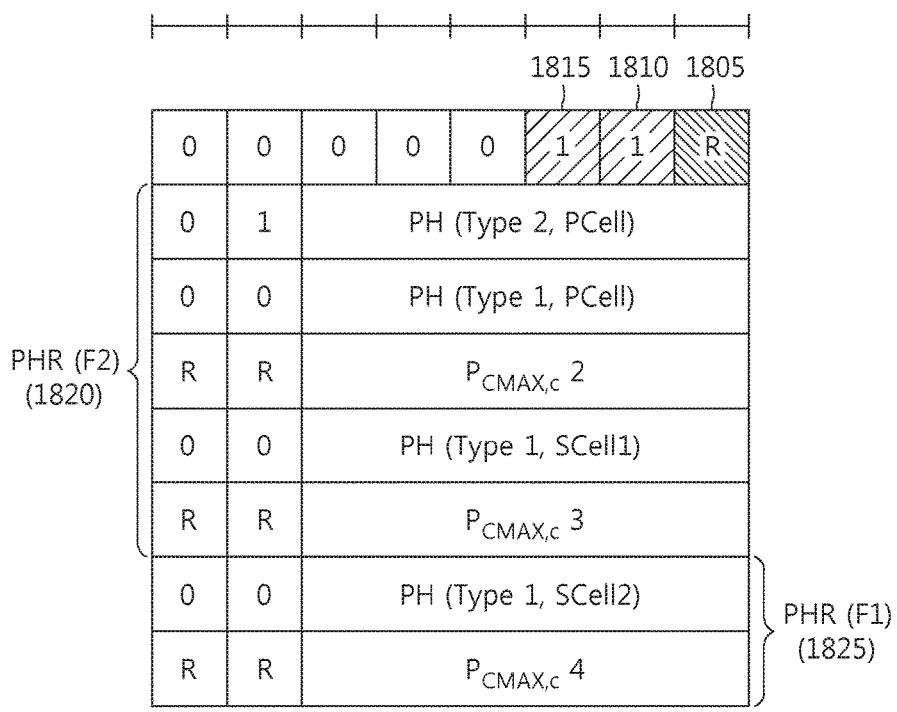
FIG. 18 illustrates still another example of a PHR MAC CE which UE transmits to a base station according to an exemplary embodiment.

FIG. 18 illustrates yet another example of a PHR MAC CE which UE transmits to a base station according to an exemplary embodiment.

Referring to FIG. 18, an index 1810 for SCell1 and SCell2 is '1'. This indicates that the PH values are reported in the SCell1 and the SCell2.

Further, the PHR MAC CE is constituted by 8 bytes, in second to sixth bytes, a PHR 1820 for the frequency band F2 is included, and in seventh to eighth bytes, a PHR 1825 for the frequency band F1 is included.

That is, only activated serving cells belonging to another base station may be included in the PHR MAC CE. However, the transmitted PHR information does not include "PHR,c" or "$P_{CMAX},c$" values simultaneously calculated with respect to all activated cells in the same TTI. The PHR information is constituted by the PHR,c and $P_{CMAX},c$ values calculated only when each base station and the UE are connected to each other in different TTIs with uplink.

Consequently, the UE transmits the uplink frame to simultaneously transmit the PHR for the frequency band F1 together with the PHR for the frequency band F2.

Subsequently to step S1510, the second base station may transfer scheduling information for the UE to the first base station (S1515).

For example, even though the PHR can not be transferred because the backhaul between the first base station and the second base station is non-ideal, in the case of transferring scheduling information (for example, UL grant), the scheduling information for the UE may be transferred from the second base station to the first base station.

Figure 19:
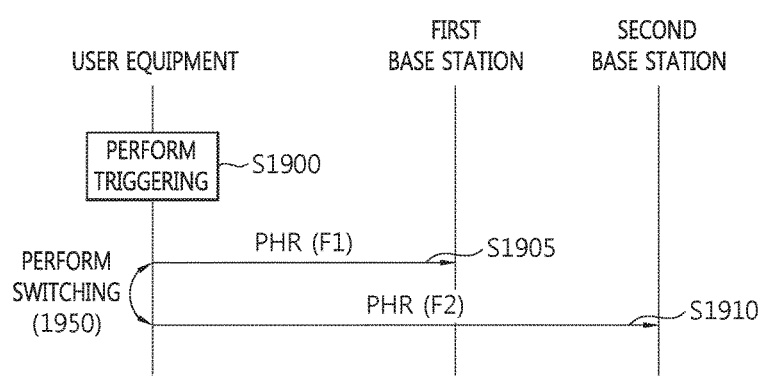
FIG. 19 is a flowchart illustrating still yet another example of a procedure in which UE reports power headroom according to an exemplary embodiment.

FIG. 19 is a flowchart illustrating another example of a procedure in which UE reports power headroom according to an exemplary embodiment. FIG. 19 illustrates an example in which the UE directly transmits the PHR to the first base station and the second base station regardless of connection (e.g., backhaul) between the first base station and the second base station (Embodiment 2-3). This is referred to as direct signaling.

As one example, the first base station may be one of the macro base station and the small base station. As another example, the first base station may be the scheduler for SmC and the second base station may be the scheduler for the MAC.

Referring to FIG. 19, the UE triggers the PHR based on the path loss change for triggering or based on the PHR periodic timer (S1900).

As one example, the UE triggers the PHR based on the path loss change for triggering.

As another example, the UE triggers the PHR based on the case in which the PHR periodic timer expires for triggering. In this case, the PHR periodic timer may be configured by the unit of the UE or by the unit of the base station or similarly to the PHR prohibit timer.

Subsequently to step S1900, when the PHR transmission criterion is satisfied, the UE transmits the PHR for the frequency band F1 to the first base station (S1905) and transmits the PHR for the frequency band F2 to the second base station (S1910). In this case, since the PHR transmission to the first base station and the PHR transmission to the second base station may not be simultaneously performed, the PHR transmission to the first base station may be first performed or the PHR transmission to the second base station may be first performed. That is, switching 1950 may be performed.

When an object performing uplink physical layer scheduling exists in the macro base station and the small base station, the PHR information is constituted by only the cells in the corresponding base station to be transmitted.

As one example, the first base station and the second base station configure different timers, respectively. For each base station, values and operations of a PHR prohibition timer and a PHR periodic timer are independent.

As another example, information on cells included in different base stations may not be included in the PHR. That is, in the PHR transmitted to the first base station, information on the frequency band F2 is not included and in the PHR transmitted to the second base station, information on the frequency band F1 is not included.

As yet another example, information on cells included in different base stations may be included in a virtual PHR form. That is, in the PHR transmitted to the first base station, information on the frequency band F2 is included in the virtual PHR form and in the PHR transmitted to the second base station, information on the frequency band F1 is included in the virtual PHR form. Here, the virtual PHR means a PHR without $P_{CMAX},c$.

Each of the first base station and the second base station may perform the uplink scheduling for the UE based on the PHR.

As one example, the MAC control element of the PHR transmitted to the first base station is illustrated in FIG. 14.

As another example, the MAC control element of the PHR transmitted to the second base station is illustrated in FIG. 13.

<Case 3: A Case in which the Downlink Signal May be Received from One Base Station at a Time in Two or More Different Base Stations and the Uplink Signal May be Transmitted to Only the Base Station at a Time Corresponding Thereto>

The UE triggers the PHR based on the path loss change for triggering or based on the PHR periodic timer.

In this case, the PHR triggering may independently exist for each connection relation between the small base station and the macro base station. That is, in the case of the uplink simultaneous transmission, when the PHR is triggered with respect to the serving cell included in at least one base station, the serving cells included in all of the base stations may be included in the PHR. On the contrary, when the downlink and the uplink operate with TDM, the downlink PHR triggering does not influence the PHR operation for the serving cells included in different base stations.

As an example, it is a case where a small base station without uplink physical layer scheduling and a macro base station with uplink physical layer scheduling are configured through backhaul connection.

When the PHR is triggered and the PHR transmission criterion is satisfied, the UE transmits the PHR for the frequency band F1 to the first base station or transmits the PHR for the frequency band F2 to the second base station. Since the UE may perform the uplink transmission to only one base station at a time, the UE transmits the PHR to one base station of the first base station and the second base station through switching. In this case, the first base station transfers the PHR for the frequency band F1 through the backhaul and based on the PHRs for the frequency bands F1 and F2, the second base station transfers the scheduling information on the user equipment to the first base station.

As one example, the uplink frame including the PHR is illustrated in FIG. 12.

As another example, a PHR MAC CE which the UE transmits to the base station including the primary serving cell is illustrated in FIG. 13.

As yet another example, a PHR MAC CE which the UE transmits to the base station without including the primary serving cell is illustrated in FIG. 14.

Meanwhile, as another example, there is a case where the small base station and the macro base station may not transfer the PHR information due to non-ideal backhaul connection (Embodiment 3-2). The UE wirelessly transmits the PHR for all the serving cells to the second base station.

When the PHR is triggered and the PHR transmission criterion is satisfied, the UE stores the PHR for the frequency band F1 therein and transmits the PHR for the frequency band F1 or the PHRs for the frequency bands F1 and F2 to the second base station. The second base station transfers the scheduling information for the UE to the first base station.

For example, in order to transmit all of the triggered PHRs to the macro base station, in a initially configured uplink resource 1610 (for example, subframe #8), the UE transmits the PHR for the frequency band F1 or the PHRs for the frequency bands F1 and F2.

In this case, as an example, regardless of whether to transmit the PHR for the frequency band F2, the UE may irrespectively transmit the PHR for the frequency band F1. Of course, when the PHR for the frequency band F2 is triggered before, the PHR for the frequency band F1 may be transmitted together.

Alternatively, as another example, when the PHR for the frequency band F2 is transmitted (alternatively, the PHR for the frequency band F2 is triggered), the UE may transmit the PHR for the frequency band F1 to the second base station together with the PHR for the frequency band F2. That is, in an interval when uplink transmission for the base station with a scheduler is possible, when the PHR for the base station (alternatively, a base station with the primary serving cell) without the scheduler is triggered and an uplink resource capable of transmitting the PHR is ensured, the PHR for the base station without the scheduler may be configured to be transmitted together.

As one example, the uplink frame including the PHR is illustrated in FIG. 16.

As another example, the PHR MAC CE which the UE transmits to the base station is illustrated in FIG. 17 or 18.

Meanwhile, as yet another example, there is a case (Embodiment 3-3) in which each of the small base station and the macro base station may perform the uplink physical layer scheduling. The UE directly transmits the PHR to the first base station and the second base station regardless of connection (e.g., backhaul) between the first base station and the second base station.

When the PHR transmission criterion is satisfied, the UE transmits the PHR for the frequency band F1 to the first base station and the PHR for the frequency band F2 to the second base station. In this case, since a subject that performs the uplink physical layer scheduling exists in each of the macro base station and the small base station, each PHR information is configured and transmitted only in cells in the corresponding base station. Each of the first base station and the second base station may perform the uplink scheduling for the UE based on the PHR.

As one example, the first base station and the second base station configure different timers, respectively.

As another example, information on cells included in different base stations may not be included in the PHR. That is, in the PHR transmitted to the first base station, information on the frequency band F2 is not included and in the PHR transmitted to the second base station, information on the frequency band F1 is not included.

As yet another example, information on cells included in different base stations may be included in a virtual PHR form. That is, in the PHR transmitted to the first base station, information on the frequency band F2 is included in the virtual PHR form and in the PHR transmitted to the second base station, information on the frequency band F1 is included in the virtual PHR form.

As one example, the MAC control element of the PHR transmitted to the first base station is illustrated in FIG. 14.

As another example, the MAC control element of the PHR transmitted to the second base station is illustrated in FIG. 13.

Figure 20:
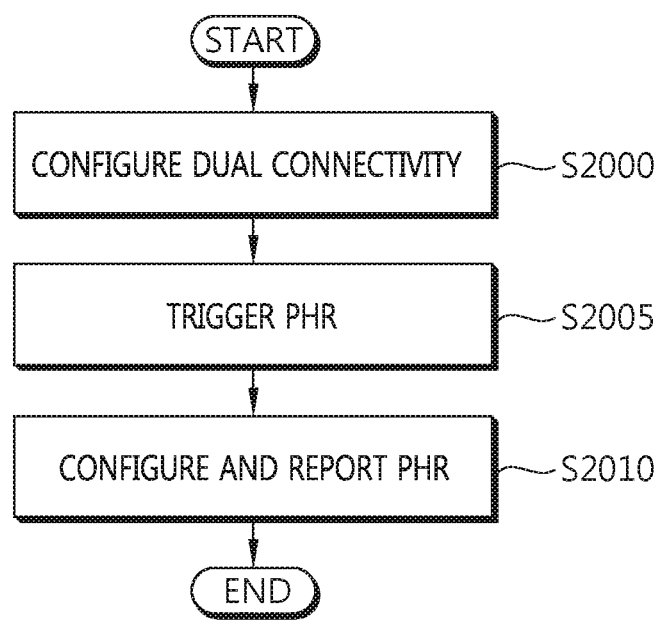
FIG. 20 is a flowchart illustrating one example of an operation of UE which reports power headroom according to an exemplary embodiment.

FIG. 20 is a flowchart illustrating one example of an operation of UE which reports power headroom according to an exemplary embodiment.

Referring to FIG. 2, uplink wireless connection of UE with two ore more different base stations is configured as dual connectivity (S2000). The dual connectivity may mean newly dual connectivity or the existing dual connectivity state.

In the dual connectivity of the UE, there are three cases including 1) a case in which a downlink signal may be simultaneously received from two or more different base stations and the uplink signal may be simultaneously transmitted, 2) a case in which a downlink signal may be simultaneously received from two or more different base stations, but the uplink signal may be transmitted to only one base station at a time, and 3) a case in which the downlink signal may be received from one base station among two or more different base stations at a time and the uplink signal may be transmitted only to the base station at a time corresponding thereto.

Subsequently to step S2000, the UE triggers a power headroom report (S2005).

As one example, the UE triggers the power headroom report based on a path loss change for triggering. In detail, after transmitting the PHR most recently (alternatively, immediately previously) based on a current point of time, the UE triggers the PHR when a situation in which a variation width of a path loss value (e.g., by the unit of dB) in at least one activated serving cell used as a path loss reference (PLR) is equal to or more than a predetermined value (e.g., a value set to 'dl-PathlossChange') occurs and a PHR prohibit timer (e.g., prohibitPHR-Timer) expires or when the PHR prohibit timer expires and the situation occurs. The PHR prohibit timer may be configured by the unit of the UE or by the unit of the base station. When the PHR prohibit timer is configured based on the base station, the PHR prohibit timer may be constituted by PHR prohibit timers.

As another example, the UE may trigger the power headroom report based on a PHR periodic timer. In this case, the PHR periodic timer may be configured by the unit of the UE or by the unit of the base station. Alternatively, the PHR periodic timer may be configured similarly to the PHR prohibit timer.

Subsequently to step S2005, when a PHR transmission criterion is satisfied, the UE configures power headroom information and reports the configured power headroom information to the base station (S2010).

In this case, the 'PHR transmission criterion' may be a case in which a space is provided, which is sufficient to transmit an extended PHR MAC CE in which uplink resources allocated in the same TTI with respect to the serving cells corresponding to each base station include both PH,c (that is, PH for serving cell c) and $P_{CMAX,c}$ (that is, $P_{CMAX}$ for serving cell c) for all activated serving cells.

As one example (case 1) of step S2010, when the UE may simultaneously receive downlink signals from two or more different base stations and simultaneously transmit uplink signals, the UE may transmit a PHR including both the PH for the frequency band F1 and the PH and $P_{CMAX}$ for the frequency band F2 to a first base station when the PHR transmission criterion is satisfied. A MAC control element of the PHR may be illustrated in FIG. 9. In this case, the first base station may transfer the PHR including both the PH for the frequency band F1 and the PH for the frequency band F2 to a second base station through backhaul.

Alternatively, as another example, the UE may directly transmit the PHR to each of the first base station and the second base station.

Alternatively, as another example, the UE may duplicatively transmit the PHR to the first base station and the second base station. The duplicative transmission includes simultaneous transmission and non-simultaneous transmission. When one timer may be configured for each UE, the simultaneous transmission may be performed or when one timer may be configured for each base station, the non-simultaneous transmission may be performed.

As another example (case 2) of step S2010, when wireless connection with two or more different base stations is configured with respect to radio connection and the downlink signals may be simultaneously received, but the uplink signal is transmitted to only one base station at a time, the UE transmits the PHR to one base station (e.g., the first base station0 of the first base station and the second base station when the PHR transmission criterion is satisfied. In this case, the first base station may transfer the PHR for the frequency band F1 to the second base station through the backhaul and the second base station may transfer scheduling information for the UE to the first base station. Herein, the PHR transmitted to the first base station is the PHR for the frequency band F1 and the PHR transmitted to the second base station is the PHR for the frequency band F2. An uplink frame structure including the PHR which the UE transmits to the first base station or the second base station may be illustrated in FIG. 12, the PHR MAC CE which the UE transmits to the base station including a primary serving cell may be illustrated in FIG. 13, and the PHR MAC CE which the UE transmits to a base station not including the primary serving cell may be illustrated in FIG. 14.

Alternatively, as another example, when the second base station having an uplink physical layer scheduling authority may not transfer the PHR to the first base station having no uplink physical layer scheduling authority through backhaul connection, the UE may wirelessly transmit the PHRs for all serving cells to the second base station.

Alternatively, as another example, the UE may store the PHR for the frequency band F1 and when the PHR transmission criterion is satisfied, the UE may transmit the PHR for the frequency band F1 or the PHRs for the frequency bands F1 and F2 to the second base station. In this case, the UE may irrelevantly transmit the PHR for the frequency band F1 regardless of transmission of the PHR for the frequency band F2. When the PHR for the frequency band F2 is previously triggered, the PHR for the frequency band F2 may be transmitted together with the is PHR for the frequency band F1. The PHR MAC CE which the UE transmits to the base station may be illustrated in FIG. 17 or 18.

Alternatively, as another example, the UE may directly transmit the PHR to each of the first base station and the second base station. That is, when the PHR transmission criterion is satisfied, the UE transmits the PHR for the frequency band F1 to the first base station and the PHR for the frequency band F2 to the second base station. In this case, since the PHR transmission to the first base station and the PHR transmission to the second base station may not be simultaneously performed, the PHR transmission to the first base station may be first performed or the PHR transmission to the second base station may be first performed. Further, information on cells included in another base station may not be included in the PHR or may be included in a virtual PHR form.

As another example (case 3) of step S2010, when the downlink signal may be received from one base station among two or more different base stations at a time and the uplink signal may be transmitted to only the base station at a time corresponding thereto, the UE transmits the PHR for the frequency band F1 to the first base station or transmits the PHR for the frequency band F2 to the second base station through switching. In this case, the first base station transfers the PHR for the frequency band F1 to the second base station through the backhaul and the second base station transfers the scheduling information for the UE to the first base station based on the PHRs for the frequency bands F1 and F2.

Alternatively, as another example, when the small base station and the macro base station may not transfer the PHR information due to abnormal backhaul connection, the UE stores the PHR for the frequency band F1 therein and transmits the PHR for the frequency band F1 or the PHRs for the frequency band F1 and the frequency band F2 to the second base station.

In this case, the second base station transfers the scheduling information for the UE to the first base station.

Alternatively, as another example, when each of the small base station and the macro base station may perform the uplink physical scheduling, the UE directly transmits the PHR to each of the first base station and the second base station. That is, since a subject that performs the uplink physical layer scheduling exists in each of the macro base station and the small base station, each PHR information is configured and transmitted only in cells in the corresponding base station. In this case, information on cells included in another base station may not be included in the PHR or may be included in a virtual PHR form.

Figure 21:
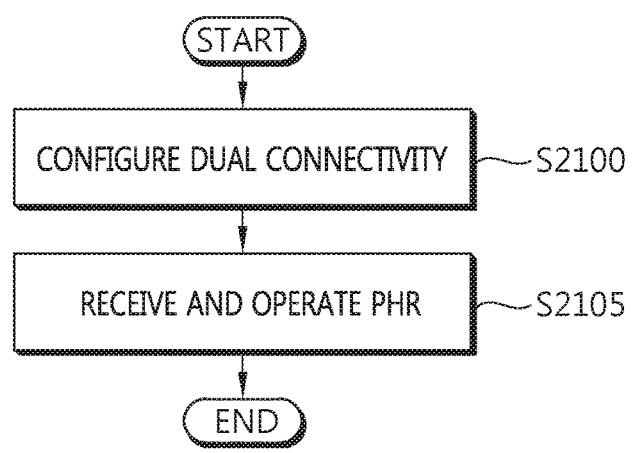
FIG. 21 is one example of a flowchart illustrating an operation of a base station according to an exemplary embodiment. The base station may be a small base station or a macro base station.

FIG. 21 is one example of a flowchart illustrating an operation of a base station according to an exemplary embodiment. The base station may be the small base station or the macro base station.

Referring to FIG. 21, uplink wireless connection of two ore more different base stations with UE is configured as dual connectivity (S2100). The dual connectivity may mean newly dual connectivity or the existing dual connectivity state.

Subsequently to step S2100, when the PHR transmission criterion is satisfied, the base station receives the power headroom information from the UE (S2105).

As one example (case 1) of step S2105, in the case where the UE may simultaneously receive the downlink signals from two or more different base stations and simultaneously transmit the uplink signals, when the base station receives the PHR including both the PH for the frequency band F1 and the PH and $P_{CMAX}$ for the frequency band F2 from the UE, the base station transfers the PHR including both the PH for the frequency band F1 and the PH for the frequency band F2 to the second base station. The MAC control element of the PHR may be illustrated in FIG. 9.

As another example (case 2) of step S2105, in the case where radio connection with two or more different base stations is configured with respect to uplink and the downlink signals may be simultaneously received, but the uplink signal is transmitted to only one base station at a time, when the base station receives the PHR from the UE, the base station transfers the PHR for the frequency band F1 which is a serving frequency band to the second base station through the backhaul and receives the scheduling information for the UE from the second base station.

Alternatively, as another example, when the second base station having the uplink physical layer scheduling authority may not transfer the PHR to the first base station having no uplink physical layer scheduling authority through the backhaul connection, the base station wirelessly receives the PHRs for all serving cells from the UE.

Alternatively, as another example, the base station may receive the PHR for the frequency band F2 from the UE together with the PHR for the frequency band F1 which the UE stores therein.

As another example (case 3) of step S2010, when the downlink signal may be received from one base station among two or more different base stations at a time and the uplink signal may be transmitted to only the base station at a time corresponding thereto, the base station receives the PHR for the frequency band F1 which is the serving frequency band through the switching and transfers the PHR for the frequency band F1 to the second base station through the backhaul. When the second base station separately receives the PHR for the frequency band 2 which is the serving frequency band, the base station receives the scheduling information for the UE from the second base station.

Figure 22:
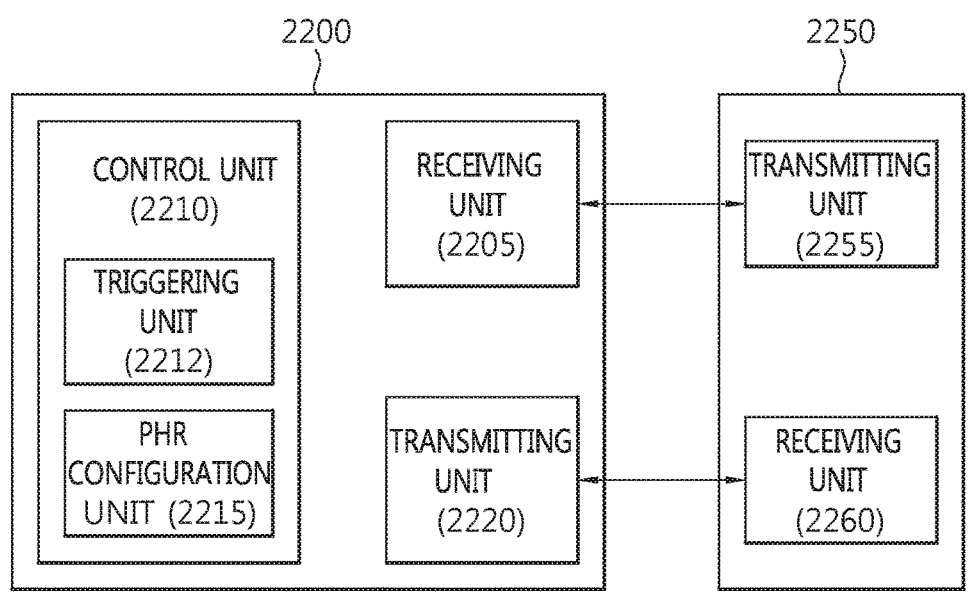
FIG. 22 is a block diagram illustrating an example of an apparatus of transmitting and receiving power headroom reports according to an exemplary embodiment.

FIG. 22 is a block diagram illustrating an example of an apparatus of transmitting and receiving power headroom reports according to an exemplary embodiment.

Referring to FIG. 22, UE 2200 includes a receiving unit 2205, a control unit 2210, or a transmitting unit 2220. The control unit 2210 may further include a triggering unit 2212 or a PHR configuration unit 2215.

In the UE 2200, uplink wireless connection with two or more base stations is configured by dual connectivity.

The triggering unit 2212 triggers power headroom reports based on path loss change or a PHR periodic timer.

The HR configuration unit 2215 constitutes power headroom information.

The transmitting unit 2220 reports the power headroom information to the base station 2250.

In the case where the UE 2200 may simultaneously receive a downlink signal from two or more different base stations and simultaneously transmit an uplink signal, the transmitting unit 2220 may transmit a PHR including a PH for the frequency band F1, a PH for the frequency band F2, and $P_{CMAX}$ to the first base station. Alternatively, the transmitting unit 2220 may transmit the PHR to the first base station and the second base station, respectively. Alternatively, the transmitting unit 2220 may redundantly transmit the PHR to the first base station and the second base station.

Wireless connection with two or more different base stations for uplink is configured and simultaneously, the downlink signal may be received, but when the uplink signal is transmitted to only one base station at a time, the transmitting unit 2220 transmits the PHR to one (for example, the first base station) of the first base station and the second first base station.

The transmitting unit 2220 transmits the PHR to either the first base station or the second first base station through switching, and the PHR transmitted to the first base station is the PHR for the frequency band F1 and the PHR transmitted to the second base station is the PHR for the frequency band F2. When the second base station having an uplink physical layer scheduling authority may not transfer the PHR by backhaul-connecting the first base station having no uplink physical layer scheduling authority, the transmitting unit 2220 transmits the PHR for all serving cells to the second base station. Alternatively, based on the PHR for the frequency band F1 stored therein, the transmitting unit 2220 may transmit the PHR for the frequency band F1 or the PHR for the frequency bands F1 and F2 to the second base station. Alternatively, the transmitting unit 2220 may transmit the PHR for the frequency band F1 to the first base station or the PHR for the frequency band F2 to the second base station.

In the case where the downlink signal may be received from one base station of two or more different base stations at a time and the uplink signal may be transmitted to only the base station at a time corresponding thereto, the transmitting unit 2220 transmits the PHR for the frequency band F1 to the first base station or the PHR for the frequency band F2 to the second base station through switching. Alternatively, in the case where the small base station and the macro base station may not transfer the PHR information due to non-ideal backhaul connection, based on the PHR for the frequency band F1 stored therein, the transmitting unit 2220 may transmit the PHR for the frequency band F1 or the PHR for the frequency bands F1 and F2 to the second base station. Alternatively, in the case where the small base station and the macro base station may perform uplink physical layer scheduling, respectively, the transmitting unit 2220 transmits the PHR information constituted by only cells in the corresponding base station to the first base station and the second base station, respectively.

Meanwhile, the base station 2250 includes a transmitting unit 2255 and a receiving unit 2260.

In two or more different base stations 2250, uplink wireless connection with the UE 2200 is configured by dual connectivity.

The receiving unit 2260 receives power headroom information from the UE 2200.

In the case where the UE 2200 may simultaneously receive a downlink signal from two or more different base stations and simultaneously transmit an uplink signal, the receiving unit 2260 may receive a PHR including a PH for the frequency band F1, a PH for the frequency band F2, and $P_{CMAX}$ from the UE 2200. In this case, the transmitting unit 2255 transmits the PHR including the PH for the frequency band F1 and the PH for the frequency band F2 to the second base station through backhaul.

The wireless connection with two or more different base stations with uplink is to configured and simultaneously, the downlink signal may be received, but when the uplink signal is transmitted to only one base station at a time, the receiving unit 2260 receives the PHR from the UE 2200 and the transmitting unit 2255 transmits the PHR for the frequency band F1 as the serving frequency band through backhaul to the second base station, and the receiving unit 2260 receives scheduling information on the UE 2200 from the second base station. Alternatively, when the PHR may not be received from the second base station having the uplink physical layer scheduling authority through backhaul connection, the receiving unit 2260 wirelessly receives the PHR for all serving cells from the UE 2200. Alternatively, the receiving unit 2260 may also receive from the UE 2200 the PHR for the frequency band F2 together with the PHR for the frequency band F1 stored in the UE 2200.

In the case where the downlink signal may be received from one base station of two or more different base stations at a time and the uplink signal may be transmitted to only the base station at a time corresponding thereto, the receiving unit 2260 receives the PHR for the frequency band F1 as the serving frequency band through switching and the transmitting unit 2255 transmits the PHR for the frequency band F1 to the second base station through backhaul. When the second base station separately receives the PHR for the frequency band F2 as the serving frequency band, the receiving unit 2260 receives the scheduling information on the UE 2200 from the second base station.

The inventive concept described as above is not limited by the aforementioned exemplary embodiments and the accompanying drawings because it will be apparent to those skilled in the art that various substitutions, modifications, and changes can be made within the scope without departing from the technical spirit of the present invention.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for transmitting a power headroom report (PHR) by a user equipment performing wireless communication based on dual connectivity, the method comprising:
    triggering the PHR based on at least one of a path loss change or a periodic timer; and
    transmitting at least one PHR to a first base station and a second base station according to the dual connectivity,
    wherein the at least one PHR comprises both a first power headroom (PH) for a first frequency band that is a serving frequency of the first base station and a second PH for a second frequency band that is the serving frequency of the second base station, when the user equipment simultaneously receives downlink signals from the first base station and the second base station and simultaneously transmits an uplink signal, and
    wherein the transmitting of the at least one PHR comprises transmitting the at least one PHR for a first frequency band to the second base station when the at least one PHR for the second base station is triggered based on the user equipment receiving the downlink signals from one base station of the first base station and the second base station at a time and transmitting an uplink signal to only the corresponding base station at a time.

2. The method of claim 1, wherein the at least one PHR comprises an
    indicator indicating whether the at least one PHR comprises a PHR for a primary serving cell or an indicator indicating whether the PH is based on actual transmission or a reference format.

3. The method of claim 1, wherein:
    when one timer is configured in the user equipment, a PHR for the first base station and a PHR for the second base station are simultaneously transmitted, and
    when one timer is configured in each of the first base station and the second base station, the PHR for the first base station and the PHR for the second base station are transmitted at different times.

4. The method of claim 1, wherein:
    the user equipment receives downlink signals from one base station of the first base station and the second base station at a time and transmits an uplink signal to only the one corresponding base station at a time,
    when the PHR for the second base station is triggered and all triggered PHRs are transmitted, the PHR for a first frequency band is transmitted.

5. The method of claim 1, wherein when each of the first base station and the second base station performs uplink scheduling, the PHR for a first frequency band is configured only in cells in the first base station and the PHR for a second frequency band is configured only in cells in the second base station.

6. The method of claim 1, wherein different timers are configured in the first base station and the second base station.

7. A method for transmitting a power headroom report (PHR) by a user equipment performing wireless communication based on dual connectivity, the method comprising:
    triggering the PHR based on at least one of a path loss change or a periodic timer; and
    transmitting at least one PHR to a first base station and a second base station according to the dual connectivity,
    wherein the at least one PHR comprises both a first power headroom (PH) for a first frequency band that is a serving frequency of the first base station and a second PH for a second frequency band that is the serving frequency of the second base station, when the user equipment simultaneously receives downlink signals from the first base station and the second base station and simultaneously transmits an uplink signal,
    wherein the user equipment receives downlink signals from one base station of the first base station and the second base station at a time and transmits an uplink signal to only the one corresponding base station at a time, and wherein when the PHR for the second base station is triggered and all triggered PHRs are transmitted, the PHR for a first frequency band is transmitted.

8. The method of claim 7, wherein the transmitting of the at least one PHR
    comprises transmitting the at least one PHR comprising a first PH to the first base station and the at least one PHR comprising a second PH to the second base station when an uplink radio connection of the user equipment is configured with the first base station and the second base station, and the user equipment simultaneously receives downlink signals but transmits an uplink signal to only one base station at a time.

9. The method of claim 7, wherein the transmitting of the at least one PHR comprises transmitting the at least one PHR for a first frequency band to the second base station when the at least one PHR for the second base station is triggered based on the user equipment receiving the downlink signals from one base station of the first base station and the second base station at a time and transmitting an uplink signal to only the corresponding base station at a time.

10. The method of claim 7, wherein the at least one PHR comprises an
    indicator indicating whether the at least one PHR comprises a PHR for a primary serving cell or an indicator indicating whether the PH is based on actual transmission or a reference format.

11. The method of claim 7, wherein:
    when one timer is configured in the user equipment, a PHR for the first base station and a PHR for the second base station are simultaneously transmitted, and
    when one timer is configured in each of the first base station and the second base station, the PHR for the first base station and the PHR for the second base station are transmitted at different times.

12. The method of claim 7, wherein when each of the first base station and the second base station performs uplink scheduling, the PHR for a first frequency band is configured only in cells in the first base station and the PHR for a second frequency band is configured only in cells in the second base station.

13. The method of claim 7, wherein different timers are configured in the first base station and the second base station.

* * * * *